US012425983B2

(12) United States Patent
Takeda et al.

(10) Patent No.: US 12,425,983 B2
(45) Date of Patent: Sep. 23, 2025

(54) POWER HEADROOM REPORTING FOR DYNAMIC POWER AGGREGATION

(71) Applicant: QUALCOMM Incorporated, San Diego, CA (US)

(72) Inventors: Kazuki Takeda, Tokyo (JP); Chiranjib Saha, San Diego, CA (US); Peter Gaal, San Diego, CA (US); Alberto Rico Alvarino, San Diego, CA (US); Wanshi Chen, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 17/542,255

(22) Filed: Dec. 3, 2021

(65) Prior Publication Data
US 2023/0180146 A1 Jun. 8, 2023

(51) Int. Cl.
*H04W 52/36* (2009.01)
*H04W 52/14* (2009.01)
*H04W 72/50* (2023.01)

(52) U.S. Cl.
CPC ....... *H04W 52/365* (2013.01); *H04W 52/146* (2013.01); *H04W 72/535* (2023.01)

(58) Field of Classification Search
CPC ............. H04W 52/365; H04W 52/146; H04W 72/535
See application file for complete search history.

(56) References Cited

U.S. PATENT DOCUMENTS

| 10,021,693 | B1* | 7/2018 | Pawar | H04W 72/0453 |
| 2012/0082041 | A1* | 4/2012 | Damnjanovic | H04W 52/365 455/67.11 |
| 2013/0194988 | A1* | 8/2013 | Kubota | H04B 7/063 370/329 |
| 2013/0201955 | A1* | 8/2013 | Vujcic | H04L 5/001 370/329 |
| 2015/0023188 | A1* | 1/2015 | Das | G01R 31/319 370/252 |

(Continued)

FOREIGN PATENT DOCUMENTS

WO WO-2017172535 A1 10/2017

OTHER PUBLICATIONS

International Search Report and Written Opinion—PCT/US2022/079156—ISA/EPO—Mar. 3, 2023 (2105941WO).

*Primary Examiner* — Angelica Perez
(74) *Attorney, Agent, or Firm* — Holland & Hart LLP

(57) ABSTRACT

Methods, systems, and devices for wireless communications are described. A user equipment (UE) may receive control signaling, such as a control message or radio resource control (RRC) signaling, from a base station indicating a time interval over which to determine available power headroom relative to a transmission power threshold. The UE may calculate the available power headroom relative to the transmission power threshold as a function of UE transmission power during the time interval. The UE may transmit a power headroom report in an uplink transmission to the base station, the power headroom report indicating the calculated available power headroom. The base station may schedule one or more uplink messages at the UE according to the available power headroom.

30 Claims, 19 Drawing Sheets

(56) References Cited

U.S. PATENT DOCUMENTS

| | | | | |
|---|---|---|---|---|
| 2015/0181640 | A1* | 6/2015 | Kwong | H04W 72/23 |
| | | | | 370/329 |
| 2016/0029239 | A1* | 1/2016 | Sadeghi | H04W 52/244 |
| | | | | 370/252 |
| 2017/0325220 | A1* | 11/2017 | Li | H04L 5/0048 |
| 2018/0077658 | A1* | 3/2018 | Nory | H04L 1/1854 |
| 2018/0097578 | A1* | 4/2018 | Li | H04W 52/365 |
| 2018/0146440 | A1* | 5/2018 | Hosseini | H04W 72/12 |
| 2019/0081657 | A1* | 3/2019 | Zeng | H04W 52/146 |
| 2019/0141644 | A1* | 5/2019 | Ozturk | H04W 52/34 |
| 2019/0199571 | A1* | 6/2019 | John Wilson | H04W 52/281 |
| 2020/0112926 | A1* | 4/2020 | Laghate | H04B 7/0695 |
| 2020/0229104 | A1* | 7/2020 | MolavianJazi | H04W 72/1268 |
| 2020/0252882 | A1* | 8/2020 | Charipadi | H04W 52/245 |
| 2021/0051606 | A1* | 2/2021 | Yang | H04W 80/02 |
| 2022/0070697 | A1* | 3/2022 | Eleftheriadis | H04W 24/02 |
| 2023/0327934 | A1* | 10/2023 | El Hamss | H04W 52/365 |
| | | | | 370/329 |
| 2025/0184777 | A1* | 6/2025 | Jian | H04W 72/1268 |

* cited by examiner 400-a 400-b

POWER HEADROOM REPORTING FOR DYNAMIC POWER AGGREGATION

FIELD OF TECHNOLOGY

The following relates to wireless communications, including power headroom reporting for dynamic power aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may communicate one or more messages on one or more multiple component carriers (CCs) concurrently in carrier aggregation.

SUMMARY

The described techniques relate to improved methods, systems, devices, and apparatuses that support power headroom reporting for dynamic power aggregation. Generally, the described techniques provide for a UE to receive control signaling, such as a downlink control information (DCI) message, radio resource control (RRC) signaling, or the like, indicating a time interval for determining an available power headroom. In some examples, the time interval may be defined by a control channel of the control signaling, an offset from a resource allocation for transmission of an uplink channel, or the like. The UE may calculate the available power headroom relative to a transmission power threshold. In some cases, the UE may transmit a report with the calculated available power threshold to a base station. The base station may use the report to schedule one or more uplink messages at the UE.

A method for wireless communication at a UE is described. The method may include receiving, from a base station, control signaling indicating a time interval over which to determine available power headroom relative to a transmission power threshold, calculating, based on the control signaling, the available power headroom relative to the transmission power threshold as a function of UE transmission power during the time interval, and transmitting, to the base station, a power headroom report indicating the calculated available power headroom.

An apparatus for wireless communication at a UE is described. The apparatus may include a processor, memory coupled with the processor, and instructions stored in the memory. The instructions may be executable by the processor to cause the apparatus to receive, from a base station, control signaling indicating a time interval over which to determine available power headroom relative to a transmission power threshold, calculate, based on the control signaling, the available power headroom relative to the transmission power threshold as a function of UE transmission power during the time interval, and transmit, to the base station, a power headroom report indicating the calculated available power headroom.

Another apparatus for wireless communication at a UE is described. The apparatus may include means for receiving, from a base station, control signaling indicating a time interval over which to determine available power headroom relative to a transmission power threshold, means for calculating, based on the control signaling, the available power headroom relative to the transmission power threshold as a function of UE transmission power during the time interval, and means for transmitting, to the base station, a power headroom report indicating the calculated available power headroom.

A non-transitory computer-readable medium storing code for wireless communication at a UE is described. The code may include instructions executable by a processor to receive, from a base station, control signaling indicating a time interval over which to determine available power headroom relative to a transmission power threshold, calculate, based on the control signaling, the available power headroom relative to the transmission power threshold as a function of UE transmission power during the time interval, and transmit, to the base station, a power headroom report indicating the calculated available power headroom.

In some examples of the method, apparatuses, and non-transitory computer-readable medium described herein, receiving the control signaling may include operations, features, means, or instructions for receiving, during a control channel, a control message scheduling transmission of an uplink channel carrying the power headroom report, where the time interval over which the calculated available power headroom may be calculated includes a transmission duration of the control channel.

In some examples of the method, apparatuses, and non-transitory computer-readable medium described herein, an end in time of the time interval over which the calculated available power headroom may be calculated corresponds to an end in time of the control channel.

In some examples of the method, apparatuses, and non-transitory computer-readable medium described herein, receiving the control signaling may include operations, features, means, or instructions for receiving RRC signaling configuring a resource allocation for transmission of an uplink channel carrying the power headroom report, where the time interval over which the calculated available power headroom may be calculated may be offset from the resource allocation by a defined amount of time.

In some examples of the method, apparatuses, and non-transitory computer-readable medium described herein, an end in time of the time interval over which the calculated available power headroom may be calculated corresponds to the defined amount of time.

In some examples of the method, apparatuses, and non-transitory computer-readable medium described herein, receiving the control signaling may include operations, features, means, or instructions for receiving the control signaling indicating a time period, where the power headroom report may be transmitted upon expiration of the time period.

In some examples of the method, apparatuses, and non-transitory computer-readable medium described herein, receiving the control signaling may include operations, features, means, or instructions for receiving the control signaling indicating a time period, where transmitting the power headroom report may be based on upon expiration of the time period and the calculated available power headroom satisfying an expected available power headroom threshold, the calculated available power headroom satisfying a specific absorption rate threshold, or both.

In some examples of the method, apparatuses, and non-transitory computer-readable medium described herein, calculating the available power headroom may include operations, features, means, or instructions for calculating a statistical transmission power value across one or more uplink carriers within the time interval, where the calculated available power headroom indicates a difference between the transmission power threshold and the statistical transmission power value for the time interval.

In some examples of the method, apparatuses, and non-transitory computer-readable medium described herein, the time interval may be a symbol period, a transmission occasion, a slot, or a combination thereof.

In some examples of the method, apparatuses, and non-transitory computer-readable medium described herein, the power headroom report indicates a power headroom at a symbol index, a transmission occasion index, a slot index, or a combination thereof, corresponding to the time interval.

In some examples of the method, apparatuses, and non-transitory computer-readable medium described herein, receiving the control signaling may include operations, features, means, or instructions for receiving the control signaling indicating to calculate the available power headroom for at least one frequency range of a set of multiple frequency ranges associated with one or more uplink transmissions by the UE, for at least one frequency band of a set of multiple frequency bands associated with the one or more uplink transmissions, for at least one cell group of a set of multiple cell groups associated with the base station, or a combination thereof.

In some examples of the method, apparatuses, and non-transitory computer-readable medium described herein, the power headroom report indicates a current power headroom and the calculated available power headroom.

In some examples of the method, apparatuses, and non-transitory computer-readable medium described herein, receiving the control signaling may include operations, features, means, or instructions for receiving the control signaling including one or more information elements indicating a duration of the time interval, a power headroom reporting time period, a power headroom prohibition time period, or any combination thereof.

A method for wireless communication at a base station is described. The method may include transmitting, to a UE, control signaling indicating a time interval over which to determine available power headroom relative to a transmission power threshold, receiving, from the UE, a power headroom report indicating a calculated available power headroom, and scheduling one or more uplink messages at the UE according to the calculated available power headroom.

An apparatus for wireless communication at a base station is described. The apparatus may include a processor, memory coupled with the processor, and instructions stored in the memory. The instructions may be executable by the processor to cause the apparatus to transmit, to a UE, control signaling indicating a time interval over which to determine available power headroom relative to a transmission power threshold, receive, from the UE, a power headroom report indicating a calculated available power headroom, and schedule one or more uplink messages at the UE according to the calculated available power headroom.

Another apparatus for wireless communication at a base station is described. The apparatus may include means for transmitting, to a UE, control signaling indicating a time interval over which to determine available power headroom relative to a transmission power threshold, means for receiving, from the UE, a power headroom report indicating a calculated available power headroom, and means for scheduling one or more uplink messages at the UE according to the calculated available power headroom.

A non-transitory computer-readable medium storing code for wireless communication at a base station is described. The code may include instructions executable by a processor to transmit, to a UE, control signaling indicating a time interval over which to determine available power headroom relative to a transmission power threshold, receive, from the UE, a power headroom report indicating a calculated available power headroom, and schedule one or more uplink messages at the UE according to the calculated available power headroom.

Some examples of the method, apparatuses, and non-transitory computer-readable medium described herein may further include operations, features, means, or instructions for transmitting, during a control channel, a control message scheduling transmission of an uplink channel carrying the power headroom report, where the time interval over which the calculated available power headroom may be calculated includes a transmission duration of the control channel.

In some examples of the method, apparatuses, and non-transitory computer-readable medium described herein, an end in time of the time interval over which the calculated available power headroom may be calculated corresponds to an end in time of the control channel.

Some examples of the method, apparatuses, and non-transitory computer-readable medium described herein may further include operations, features, means, or instructions for transmitting RRC signaling configuring a resource allocation for transmission of an uplink channel carrying the power headroom report, where the time interval over which the calculated available power headroom may be calculated may be offset from the resource allocation by a defined amount of time.

In some examples of the method, apparatuses, and non-transitory computer-readable medium described herein, an end in time of the time interval over which the calculated available power headroom may be calculated corresponds to the defined amount of time.

In some examples of the method, apparatuses, and non-transitory computer-readable medium described herein, transmitting the control signaling may include operations, features, means, or instructions for transmitting the control signaling indicating a time period, where the power headroom report may be received upon expiration of the time period.

In some examples of the method, apparatuses, and non-transitory computer-readable medium described herein, transmitting the control signaling may include operations, features, means, or instructions for transmitting the control signaling indicating a time period, where receiving the power headroom report may be based on upon expiration of the time period and the calculated available power headroom satisfying an expected available power headroom threshold, the calculated available power headroom satisfying a specific absorption rate threshold, or both.

In some examples of the method, apparatuses, and non-transitory computer-readable medium described herein, the time interval may be a symbol period, a transmission occasion, a slot, or a combination thereof.

In some examples of the method, apparatuses, and non-transitory computer-readable medium described herein, the power headroom report indicates a power headroom at a symbol index, a transmission occasion index, a slot index, or a combination thereof, corresponding to the time interval.

In some examples of the method, apparatuses, and non-transitory computer-readable medium described herein, scheduling the one or more uplink messages may include operations, features, means, or instructions for scheduling a set of multiple uplink messages at the UE based on the calculated available power headroom satisfying a threshold.

In some examples of the method, apparatuses, and non-transitory computer-readable medium described herein, scheduling the one or more uplink messages may include operations, features, means, or instructions for scheduling a single uplink message at the UE based on the calculated available power headroom satisfying a threshold.

In some examples of the method, apparatuses, and non-transitory computer-readable medium described herein, the power headroom report includes a current power headroom at the UE and the calculated available power headroom.

In some examples of the method, apparatuses, and non-transitory computer-readable medium described herein, transmitting the control signaling may include operations, features, means, or instructions for transmitting the control signaling including one or more information elements indicating a duration of the time interval, a power headroom reporting time period, a power headroom prohibition time period, or any combination thereof.

DETAILED DESCRIPTION

In some wireless communications systems, multiple frequency blocks, which may be referred to as CCs, may be assigned to a UE for carrier aggregation. A base station and UE may implement carrier aggregation such that the UE may concurrently receive one or more downlink transmissions from a base station across multiple CCs, which may increase capacity, data rate, and coverage. Similarly, the UE may benefit from using uplink dynamic power aggregation to boost an uplink transmit power for one or more concurrent transmissions. The UE may keep an average power below a threshold, while increasing an instantaneous power beyond the threshold. However, the UE may be unable to report an available uplink transmit power of the UE for a transmission instant, which may be referred to as a power headroom, to a base station.

As described herein, a UE may be configured to report an available power headroom to a base station. For example, the UE may receive control signaling (e.g., RRC signaling, a DCI message, or the like) indicating a power headroom reporting configuration. The control signaling may identify a time interval, or time window, over which to determine the available power headroom relative to a transmission power threshold. In some cases, the UE may calculate the available power threshold as a function of UE transmission power during the time interval. The UE may average transmit power across uplink carriers, or frequency bands, within the time window. The available power headroom may be the difference between the average transmit power and a maximum permitted, or threshold, transmission power of the UE. The UE may report the available power headroom according to the power headroom reporting configuration. For example, the configuration may include a periodic timer that triggers the power headroom report. The base station may schedule the UE based on the report. For example, the base station may schedule uplink transmissions across frequency bands according to a power headroom level. If the report indicates a relatively large headroom, the UE may send transmissions at a correspondingly higher transmit power level. If the report indicates relatively small available headroom, the UE may send transmissions at a correspondingly low transmit power.

Aspects of the disclosure are initially described in the context of wireless communications systems. Aspects of the disclosure are further described in the context of power headroom diagrams, resource diagrams, and process flows. Aspects of the disclosure are further illustrated by and described with reference to apparatus diagrams, diagrams, and flowcharts that relate to power headroom reporting for dynamic power aggregation.

Figure 1:
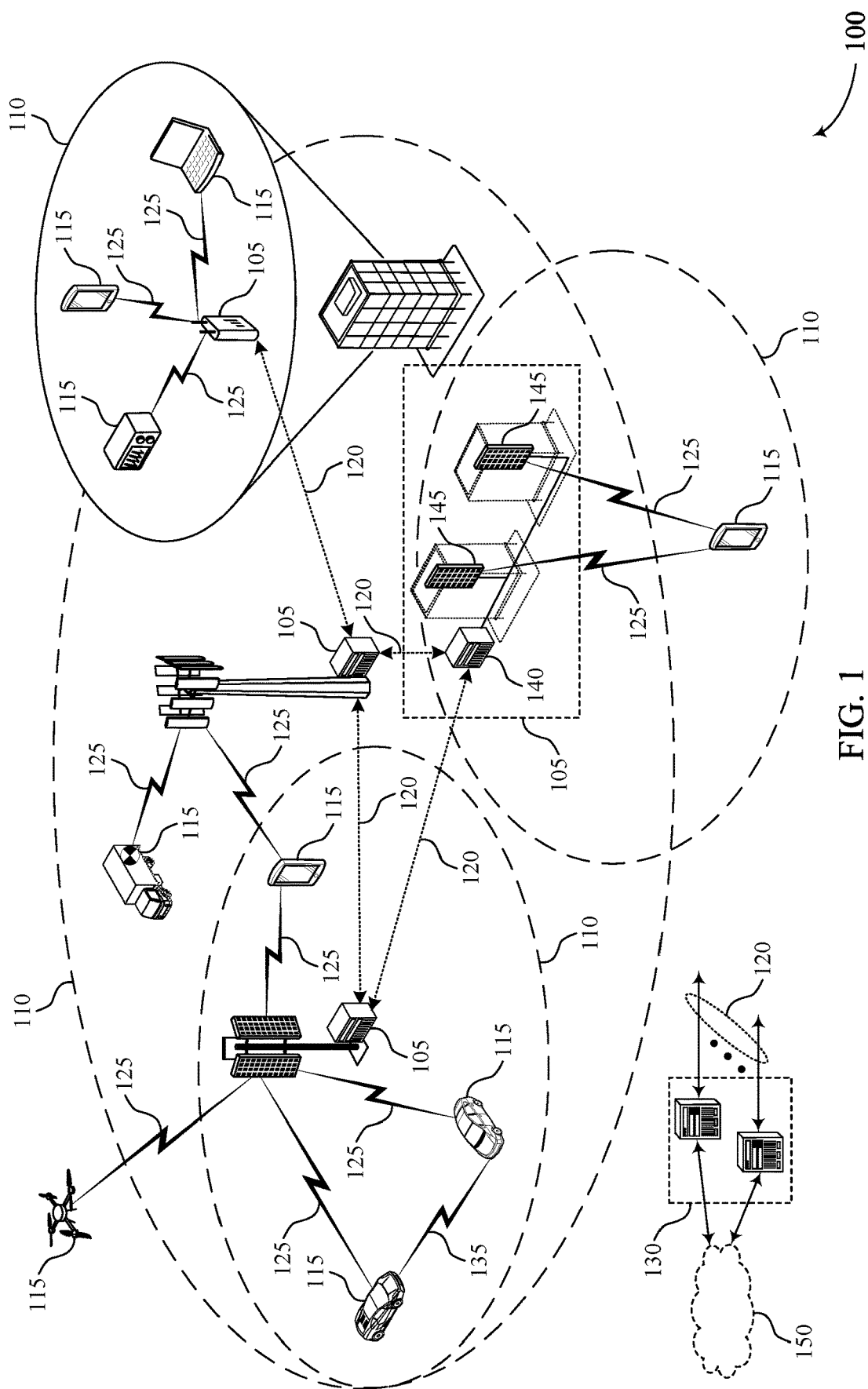
FIGS. 1 and 2 illustrate examples of wireless communications systems that support power headroom reporting for dynamic power aggregation in accordance with aspects of the present disclosure.

FIG. 1 illustrates an example of a wireless communications system 100 that supports power headroom reporting for dynamic power aggregation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may be configured to report an available power headroom to a base station 105. For example, the UE 115 may receive control signaling indicating a power headroom reporting configuration. The control signaling may identify a time interval, or time window, over which to determine the available power headroom relative to a transmission power threshold. In some cases, the UE 115 may calculate the available power threshold as a function of UE transmission power during the time interval. The UE 115 may average transmit power across uplink carriers, or frequency bands, within the time window. The available power headroom may be the difference between the average transmit power and a maximum permitted, or threshold, transmission power of the UE 115. The UE 115 may report the available power headroom according to the power headroom reporting configuration. For example, the configuration may include a periodic timer that triggers the power headroom report. The base station 105 may schedule the UE 115 based on the report.

In some examples, if an average power exceeds a threshold value, such as a maximum value, the UE 115 may send a power headroom report.

Figure 2:
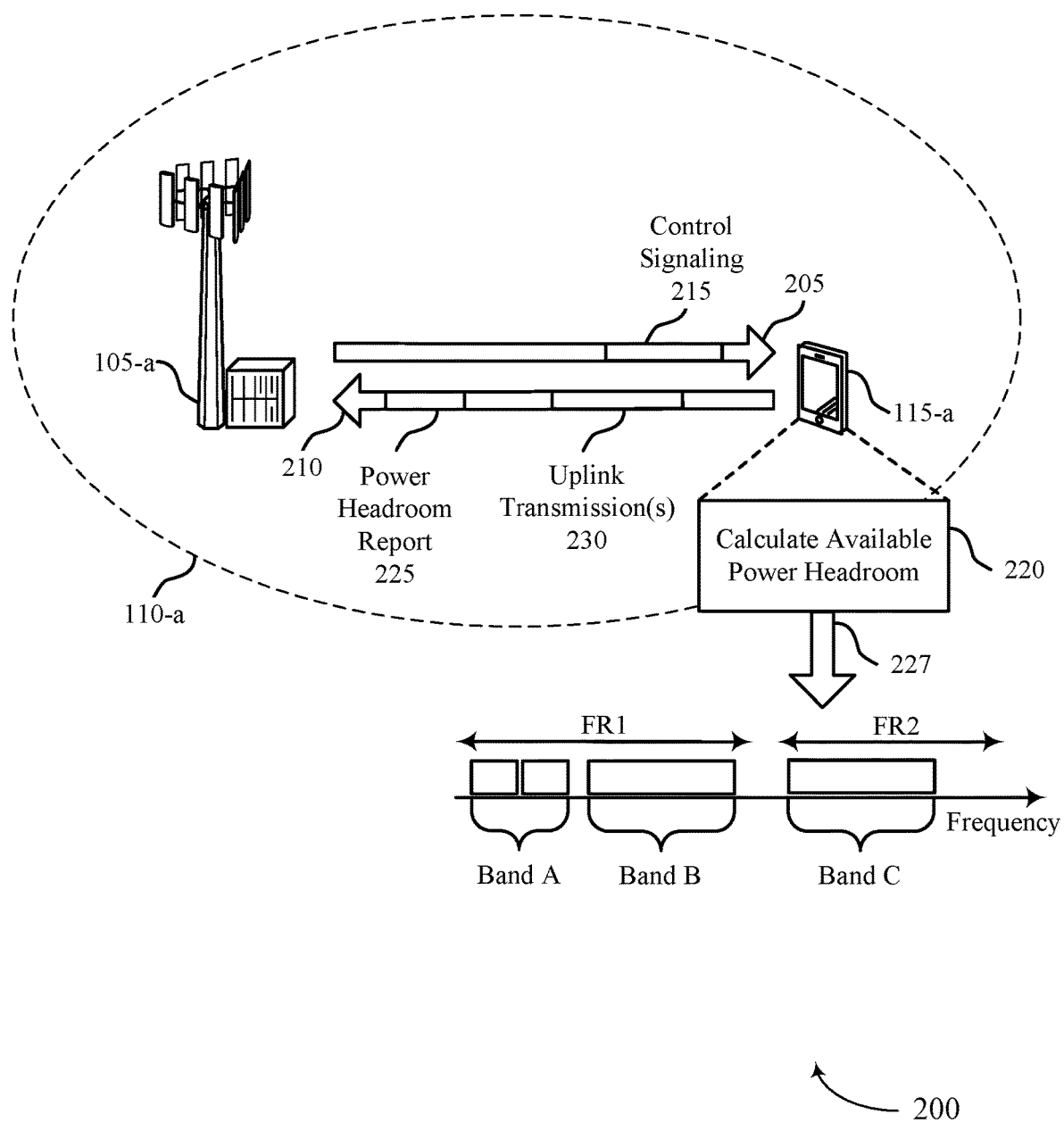

FIG. 2 illustrates an example of a wireless communications system 200 that supports power headroom reporting for dynamic power aggregation in accordance with aspects of the present disclosure. In some examples, wireless communications system 200 may implement aspects of wireless communications system 100 and may include a UE 115-a and a base station 105-a with a coverage area 110-a, which may be examples of UEs 115 and a base station 105 with a coverage area 110 as described with reference to FIG. 1. In some examples, base station 105-a and UE 115-a may communicate control information, data, or both using a downlink communication link 205. Similarly, UE 115-a may communicate control information, data, or both with base station 105-a using an uplink communication link 210. In some examples, base station 105-a may configure UE 115-a to report a power headroom for transmitting one or more uplink transmissions.

In some examples, one or more wireless devices in the wireless communications system 200 may support carrier aggregation. For example, a base station 105 may assign multiple frequency blocks (e.g., CCs) to a UE 115 for receiving one or more downlink messages concurrently. Carrier aggregation may provide for the base station 105 to increase data rate at the UE 115 for downlink messages. Similarly, uplink carrier aggregation may increase data rate from the UE 115 to the base station 105. However, in uplink, the UE 115 may be unable to perform carrier aggregation due to a transmit, or transmission, power threshold at the UE 115. That is, in a relatively large portion of a coverage area 110, the UE 115 may not efficiently use more than a fraction of the bandwidth of a single carrier due to the transmit power threshold.

In some cases, each frequency band that a UE 115 supports represents additional transmit power potential. The UE 115 and a base station 105 may perform dynamic power aggregation to tap into the additional transmit power potential. For example, base station 105-a may configure UE 115-a to use a total available short term peak power. The UE 115 may maintain specific absorption rate (SAR) compliance for a long term (e.g., 30 second or greater) peak power according to duty cycle control. The uplink carrier aggregation may provide for an uplink peak data rate boost and correspondingly increased uplink user perceived throughput. That is, uplink dynamic power aggregation may boost uplink transmit power at one or more instances, such that the UE 115 may not continuously transmit at full uplink power. Thus, the UE 115 may keep an average transmission power below a threshold while allowing instantaneous power to increase beyond the threshold from time to time.

However, an instantaneous power allocation at the UE 115 may not be based on a power allocation formula. The UE 115 may change the instantaneous power for average power compliance, which may be unpredictable behavior from a perspective of the base station 105. In some examples, communication of an available uplink transmission power of the UE 115 for a next transmission instant, known as a power headroom, may not support instantaneous and average power compliances. Since the base station 105 adjusts modulation and coding scheme (MCS), MIMO layers, MIMO precoders, bandwidth, and the like, based on the available power headroom, the format of the power headroom report may not provide for one or more UEs 115 enabled to transmit an available power headroom (e.g., with a smart transmit mode). For example, at an instant in time, a previous power headroom may be positive, indicating that an uplink scheduler may allocate additional resources or a relatively higher MCS, but the UE 115 may reduce an uplink transmission power to satisfy an average power threshold.

In some examples, a UE 115, such as UE 115-a, may receive control signaling 215 from base station 105-a indicating a time interval over which to determine available power headroom relative to a transmission power threshold. The control signaling 215 may be RRC signaling, a DCI message, or the like. The size of the time interval or window may be based on the resources allocated for the control signaling 215, which is described in further detail with respect to FIGS. 4A and 4B. In some cases, UE 115-a may calculate an available power headroom at 220. For example, UE 115-a UE 115-a may calculate the available power headroom relative to the transmission power threshold as a function of UE transmission power during the time interval. UE 115-a may average a total or sum of transmission power across uplink carriers or frequency bands within the time window. In some cases, UE 115-a may compute a new type of power headroom, avgPH (e.g., also referred to as an available power headroom), according to Equation 1:

$$\text{avgPH}(i) = P_{av,max} - P_{UL,av}(i), \quad (1)$$

where $P_{av,max}$ is a transmission power threshold (e.g., an average transmission power threshold), $P_{UL,av}$ is an average total or summed transmission power across uplink carriers or frequency bands within the time window, and i is either a symbol index, a transmission occasion index, or a slot index. The new type of power headroom may be an available power headroom relative to the transmission power threshold.

In some cases, UE 115-a may transmit a power headroom report 225 to base station 105-a based on calculating the available power headroom. The power headroom report 225 may indicate the available power headroom to base station 105-a. At 227, UE 115-a may compute and report the new type of power headroom for each frequency range or for each frequency band supported by the UE 115. Each frequency range may include one or more frequency bands. For example, a first frequency range, FR1 (e.g., 450 MHz-6,000 MHz), may include two frequency bands, Band A and Band B, while a second frequency range, FR2 (e.g., 24,250 MHz-52,600 MHz), may include a single frequency band, Band C. The available power headroom may be calculated for a frequency range, FRx, according to Equation 2:

$$\text{avgPH}(FRx,i) = P_{av,FRx,max} - P_{UL,FRx,av}(i) \quad (2)$$

where $P_{av,FRx,max}$ is an average transmission power threshold for FRx, $P_{UL,FRx,av}$ is an averaged total or summed transmission power across uplink carriers or frequency bands in FRx within the time window, and i is either a symbol index, a transmission occasion index, or a slot index.

Similarly, the available power headroom may be calculated for a frequency band, b, according to Equation 3:

$$\text{avgPH}(b,i) = P_{av,b,max} - P_{UL,b,av}(i), \tag{3}$$

where $P_{av,b,max}$ is an average transmission power threshold for b, $P_{UL,b,av}$ is an averaged total or summed transmission power across uplink carriers in b within the time window, and i is either a symbol index, a transmission occasion index, or a slot index.

In some examples, base station 105-a may regenerate an average power headroom based on the reported information. For dual connectivity (DC), a UE 115 may have multiple simultaneous connections. For example, the UE 115 may have a connection between a sub-6 GHz base station 105 and a mmW base station 105, which may be referred to as NR-DC; between itself, an NR base station, and an LTE base station, which may be referred to as E-UTRA NR DC (EN-DC); between an NR base station 105 as a primary radio access network (RAN) and an LTE base station 105 as a secondary RAN, which may be referred to as NR-Evolved-UTRA DC (NE-DC); and the like. If UE 115-a supports DC (e.g., NR-DC, EN-DC, NE-DC), the new type of power headroom may be computed and reported for each cell-group. UE 115-a may transmit the report in an uplink transmission for a cell-group with a power headroom for both cell-groups, such that a primary base station 105 and a secondary base station 105 may see the states without backhaul coordination. Additionally or alternatively, backhaul signaling between the primary base station 105 and the secondary base station 105 may be configured to exchange the new type of power headroom.

In some examples, base station 105-a may configure UE 115-a with a timer for reporting the available power headroom. For example, base station 105-a may set a periodicity for UE 115-a to report the available power headroom. Base station 105-a may configure the periodicity of the timer using the control signaling 215. UE 115-a may start the timer based on receiving the control signaling 215 and may report the available power headroom upon expiration of the timer when there is a corresponding uplink transmission. Additionally or alternatively, base station 105-a may configure UE 115-a with the periodic timer and one or more conditions to be met prior to transmitting the power headroom report 225, such that UE 115-a may report a new power headroom when there is a corresponding uplink transmission if the timer expires and one or more conditions are met. The conditions may include a value or range of avgPH (i) computed or expected for a number, N, of consecutive or non-consecutive reporting opportunities, where N is a fixed or configurable value. In some cases, the value or range may be a negative value (e.g., not within a range). The conditions may include a SAR level at UE 115-a. UE 115-a may identify conditions for reducing a total or sum transmission power across uplink carriers or frequency bands due to the SAR level. For example, UE 115-a may determine the conditions for reducing transmission power based on past observation of average total transmission power, current observation of average total transmission power, future prediction of average total transmission power, or a combination thereof.

In some examples, UE 115-a may report the available power headroom with an existing power headroom report (e.g., a legacy headroom report). For example, UE 115-a may include the available power headroom in an uplink transmission with a current power headroom. In some other examples, UE 115-a may report the available power headroom independent of the current power headroom. Base station 105-a may configure UE 115-a to include the power headroom report 225 in an information element (IE). Base station 105-a may update an IE used to configure parameters for power headroom reporting with an additional configuration for the available power headroom in the RRC protocol. Additionally or alternatively, base station 105-a may define a new IE for available power headroom which includes configuration parameters related to power headroom reporting.

In some examples, the configuration parameters may include a power headroom periodic timer (phr-PeriodicTimer), a power headroom prohibit timer (phr-ProhibitTimer), a power headroom transmit power factor change (phr-Tx-PowerFactorChange), a multiple power headroom Boolean value, a power headroom type, or the like.

In some cases, base station 105-a may schedule one or more uplink transmission 230 for UE 115-a based on the available power headroom at UE 115-a from the power headroom report 225. For example, if UE 115-a indicates a relatively high value for available power headroom, base station 105-a may schedule a correspondingly greater number of uplink transmissions 230. Similarly, if UE 115-a indicates a relatively low value for available power headroom, base station 105-a may schedule a correspondingly smaller number of uplink transmissions 230 (e.g., a single uplink transmission 230 or no uplink transmissions 230).

Figure 3A:
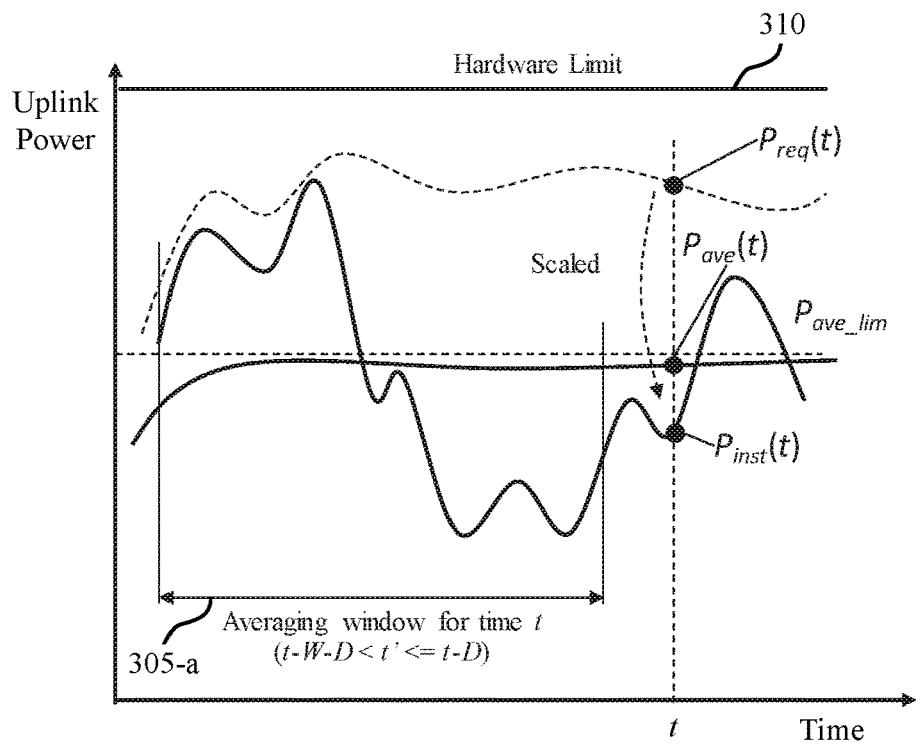
FIGS. 3A and 3B illustrate examples of power headroom diagrams that support power headroom reporting for dynamic power aggregation in accordance with aspects of the present disclosure.
Figure 3B:
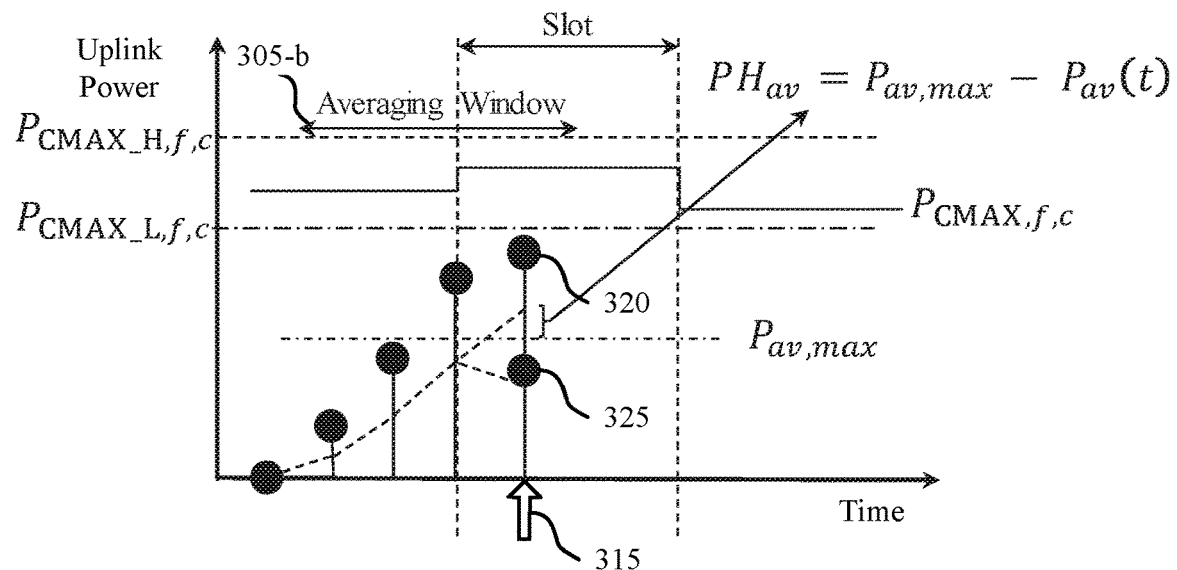

FIGS. 3A and 3B illustrate examples of power headroom diagrams 300 that support power headroom reporting for dynamic power aggregation in accordance with aspects of the present disclosure. In some examples, power headroom diagram 300-a and power headroom diagram 300-b may implement aspects of wireless communications system 100 and wireless communications system 200. For example, as illustrated in power headroom diagram 300-a and power headroom diagram 300-b, a base station 105 may configure a UE 115 to report an available power headroom over a time interval 305 or window for uplink transmissions.

In some examples, as illustrated in FIG. 3A, a UE 115 may increase an instantaneous transmission power above a threshold average transmission power based on calculating an available transmission power. The UE 115 may obtain an averaged power at time t, Pave(t), by averaging instantaneous transmission power, Pinst(t') within a time interval 305, such as time interval 305-a. The time interval 305 may be defined at the UE 115 by a base station 105 via control signaling, as described with respect to FIG. 2. In some examples, the base station 105, the UE 115, or both may determine an averaging window, or time interval 305-a, for t according to Equation 4:

$$t-W-D < t' \le t-D \tag{4}$$

where W is the size of the window and D is the gap from the end of the window to t. In some examples, D may be 0.

The UE 115 may set an instantaneous transmit power at time t, Pinst(t), such that Pave (t)≤average threshold Pave_lim. In some cases, Pave_lim may be an example of the transmission power threshold that the UE 115 is to be below (e.g., $P_{av,max}$). That is, the power headroom may be calculated according to Equation 1.

In some cases, the UE 115 may scale down the instantaneous transmit power Pinst(t) from the transmission power requested by the base station (e.g., in DCI or other control signaling) at time t, Preq(t) to comply with the average threshold Pave_lim. In some examples, there may be a hardware limit 310 for one or more components (e.g., a transmitter, transceiver, antenna, or other transmitting device at the UE 115), which may be up to 26 decibel-milliwatts (dBm), 28 dBm, or any other value. In some examples, the UE 115 may meet a SAR condition if a value of Pave (t) is below a threshold (e.g., 23 dBm). If the value of Pave (t) is above the threshold, the UE 115 may take additional precautions (e.g., additional uplink duty cycle control in addition to dynamic power aggregation).

In some examples, as illustrated in FIG. 3B, a UE 115 may calculate an available power headroom, $PH_{av}$ (e.g., for a CC), based on a threshold transmission power, $P_{av,max}$, at the UE 115 and an average transmission power during a time interval 305, such as time interval 305-b. The UE 115 may have a network configured upper bound for threshold transmission power for a component carrier, $P_{CMAx_H,f,c}$, and a lower bound for threshold transmission power for a component carrier, $P_{CMAX_L,f,c}$. The UE 115 may determine a threshold transmission power for the component carrier for each slot (e.g., time unit), $P_{CMAX,f,c}$, within the upper and lower bound. At an instant in time, 315, a current power headroom 320 may be positive, indicating that an uplink scheduler may allocate additional resources for uplink transmissions or a relatively higher MCS, but the UE 115 may reduce an uplink transmission power 325 to satisfy $P_{av,max}$.

Figure 4A:
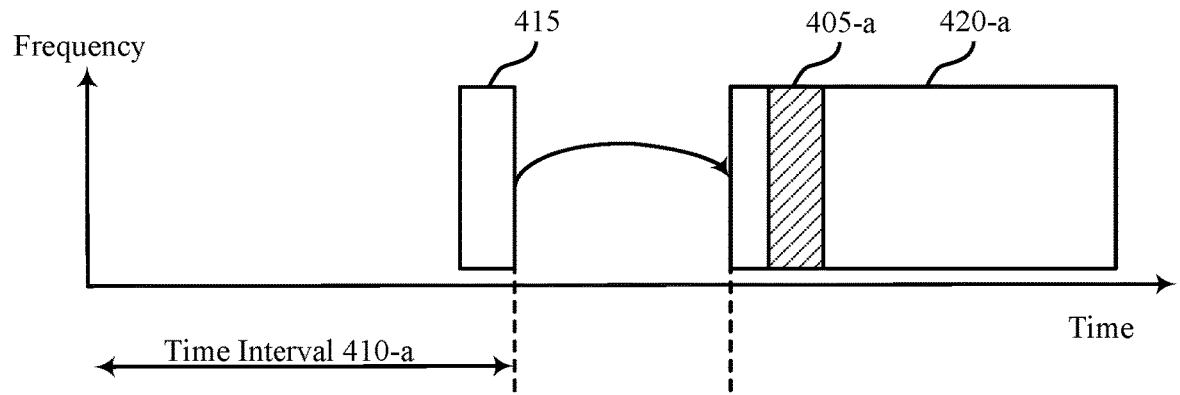
FIGS. 4A, 4B, and 5 illustrate examples of resource diagrams that support power headroom reporting for dynamic power aggregation in accordance with aspects of the present disclosure.
Figure 4B:
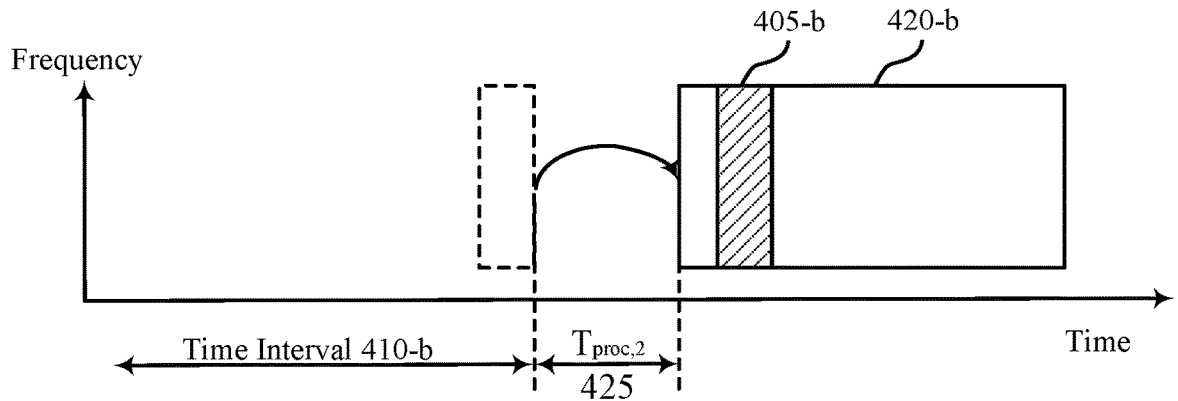

FIGS. 4A and 4B illustrate examples of resource diagrams 400 that support power headroom configuration for dynamic power aggregation in accordance with aspects of the present disclosure. In some examples, resource diagram 400-a and resource diagram 400-b may implement aspects of wireless communications system 100, wireless communications system 200, power headroom diagram 300-a, and power headroom diagram 300-b. For example, a UE 115 and a base station 105 may implement resource diagram 400-a based on the base station 105 configuring a power headroom report 405 at the UE 115 via a DCI message. In some other examples, a UE 115 and a base station 105 may implement resource diagram 400-b based on the base station 105 configuring a power headroom report 405 at the UE 115 via RRC signaling.

In some examples, a base station 105 may indicate a time interval 410 to a UE 115 over which to determine available power headroom relative to a transmission power threshold. The base station 105 may indicate the time interval 410 in control signaling. For example, as illustrated in FIG. 4A, the base station 105 may transmit the indication of time interval 410-a in a downlink control channel (e.g., in a DCI message 415 in a physical downlink control channel (PDCCH)). If power headroom report 405-a is carried by an uplink transmission 420-a, which may be scheduled by a DCI message 415, the end of the time interval 410-a for the available power headroom calculation may be the end of the DCI message 415. In some examples, uplink transmissions 420 scheduled by DCI messages 415 until the end of the time interval 410-a may be considered for computing the available power headroom (e.g., based on the average total or sum transmission power across uplink carriers or frequency bands).

In some other examples, as illustrated in FIG. 4B, the base station 105 may configure the time interval 410-b via RRC signaling. If the UE 115 transmits power headroom report 405-b in an uplink transmission 420-b configured by RRC signaling (e.g., a configured grant physical uplink shared channel (PUSCH)), the end of the time interval 410-b for power headroom report calculation may be the start of uplink transmission 420-b minus $T_{proc,2}$ 425 time (or N2 symbols).

The $T_{proc,2}$ 425 may be a defined amount of time for which a time interval is offset the resource allocation.

Figure 5:
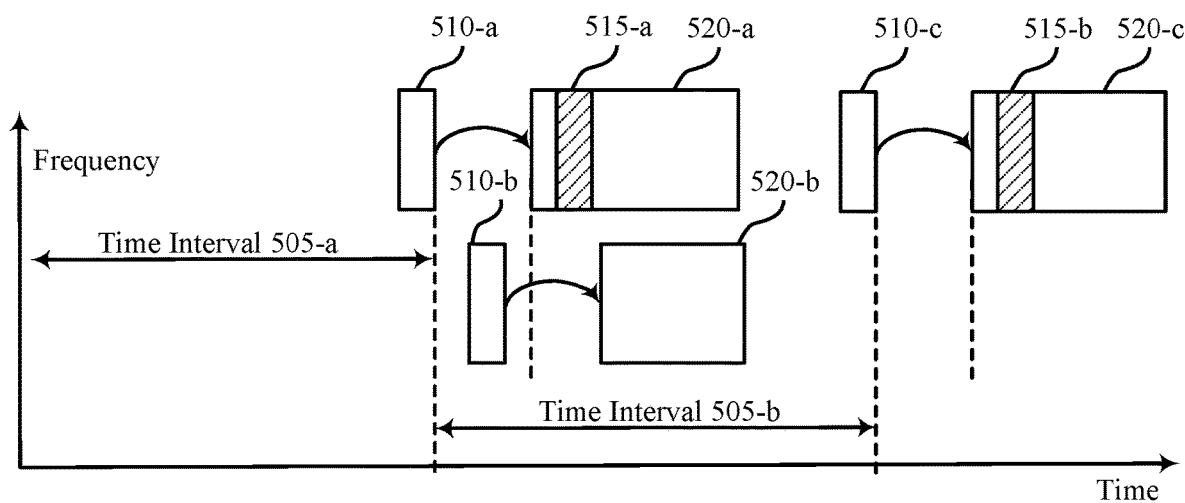

FIG. 5 illustrates an example of a resource diagram 500 that supports power headroom reporting for dynamic power aggregation in accordance with aspects of the present disclosure. In some examples, resource diagram 500 may implement aspects of wireless communications system 100, wireless communications system 200, power headroom diagram 300-a, power headroom diagram 300-b, resource diagram 400-a, and resource diagram 400-b. For example, a UE 115 and a base station 105 may implement resource diagram 500 based on the base station 105 configuring the UE 115 to calculate an available power headroom during one or more time intervals 505.

In some examples, a base station 105 may indicate a time interval 505 to a UE 115 over which to determine available power headroom relative to a transmission power threshold. The base station 105 may indicate the time interval 505 in control signaling 510. The UE 115 may transmit a power headroom report 515 in an uplink transmission 520. For example, control signaling 510-a may indicate time interval 505-a for calculating an available power headroom. The UE 115 may transmit the available power headroom based on time interval 505-a in power headroom report 515-a in uplink transmission 520-a. In some examples, if the UE 115 receives additional control signaling 510-b scheduling another uplink transmission 520-b overlapping with uplink transmission 520-a, and if uplink transmission 520-a is scheduled by control signaling 510-b after control signaling 510-a scheduling the uplink transmission 520-a or after $T_{proc,2}$ time, the UE 115 may compute the power headroom without considering uplink transmission 520-b.

In some cases, the base station 105 may configure the UE 115 with a periodic time interval 505, such that time interval 505-a and time interval 505-b may be the same. In some other cases, the base station 105 may reconfigure the time interval 505 at the UE 115. For example, the UE 115 may receive additional control signaling 510-c indicating time interval 505-b, which may be the same or different than time interval 505-a. In some examples, the UE 115 may account for uplink transmission 520-b for computing the power headroom carried by a following or future uplink transmission 520, such as uplink transmission 520-c. The UE 115 may transmit the calculated power headroom in an updated power headroom report 515-b.

Figure 6:
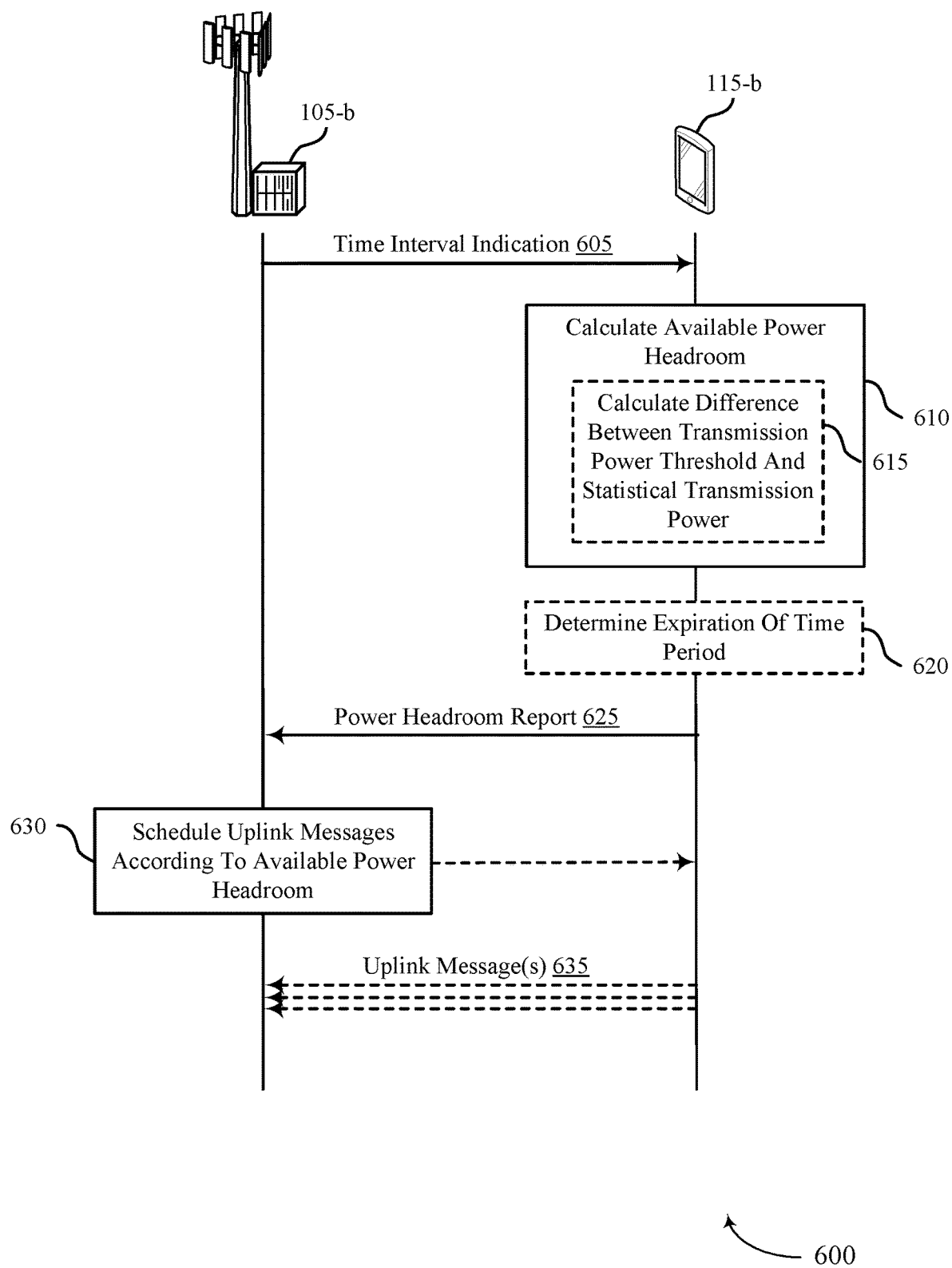
FIG. 6 illustrates an example of a process flow that supports power headroom reporting for dynamic power aggregation in accordance with aspects of the present disclosure.

FIG. 6 illustrates an example of a process flow 600 that supports power headroom reporting for dynamic power aggregation in accordance with aspects of the present disclosure. In some examples, process flow 600 may implement aspects of wireless communications system 100, wireless communications system 200, power headroom diagram 300-a, power headroom diagram 300-b, resource diagram 400-a, resource diagram 400-b, and resource diagram 500. The process flow 600 may illustrate an example of a base station 105-b indicating a time interval over which a UE 115-b may determine an available power headroom and report the power headroom to base station 105-b. Base station 105-b and UE 115-c may be examples of a base station 105 and a UE 115 as described with reference to FIGS. 1 and 2. Alternative examples of the following may be implemented, where some processes are performed in a different order than described or are not performed. In some cases, processes may include additional features not mentioned below, or further processes may be added.

At 605, base station 105-b may transmit control signaling to UE 115-b indicating a time interval over which to determine available power headroom relative to a transmission power threshold.

In some examples, base station 105-b may transmit a control message, such as a DCI message, to UE 115-b during a control channel. The control message may schedule transmission of an uplink channel carrying a power headroom report. The time interval over which UE 115-b calculates an available power headroom may include a transmission duration of the control channel. In some cases, an end in time of the time interval may be an end in time of the control channel.

In some other examples, base station 105-b may transmit RRC signaling configuring a resource allocation for transmission of an uplink channel carrying the power headroom report. The time interval over which UE 115-b calculates the available power headroom may be offset from the resource allocation by a defined amount of time (e.g., a number of symbols). The offset, or defined amount of time, may be referred to as a processing time. In some cases, an end in time of the time interval may be at the start of the offset or the defined amount of time.

In some cases, UE 115-b may receive control signaling indicating to calculate the available power headroom for at least one frequency range with one or more uplink transmissions by UE 115-b, for at least one frequency band for the one or more uplink transmissions, for at least one cell group supported by base station 105-b, or a combination thereof.

In some examples, UE 115-b may receive control signaling indicating a time period, such as a timer. The timer may be a periodic timer with a periodicity configured by base station 105-b. UE 115-b may start the timer or time period upon receiving the control signaling and may transmit a power headroom report upon expiration of the time period. Additionally or alternatively, UE 115-b may transmit the power headroom report based on one or more conditions being satisfied. For example, the conditions may include the calculated available power headroom satisfying an expected available power headroom threshold, the calculated available power headroom satisfying a SAR threshold, or both.

In some cases, UE 115-b may receive the control signaling including one or more IEs indicating a duration of the time interval, a power headroom reporting time period, a power headroom prohibition time period, or any combination thereof.

At 610, UE 115-b may calculate an available power headroom relative to the transmission power threshold as a function of UE transmission power during the time interval in the control signaling.

For example, at 615, UE 115-b may calculate an average uplink transmission power during the time interval (e.g., statistical transmission power value) across one or more uplink carriers within the time interval. The calculated available power headroom may indicate a difference between the transmission power threshold and the statistical transmission power value for the time interval (e.g., according to Equation 1). The statistical transmission power may be an average transmission power, a median transmission power, or the like for the time interval. It is noted that the techniques described herein reference average values and average thresholds, and other statistical measures, such as median, mean, or the like, may also be used.

At 620, UE 115-b may determine a timer or timer period has expired or may determine an event has occurred. UE 115-b may determine the event has occurred based on one or more conditions being satisfied at UE 115-b. The conditions may include a value or range of average power headroom for consecutive or non-consecutive reporting opportunities, a SAR condition, or the like.

At 625, UE 115-b may transmit a power headroom report to base station 105-b indicating the calculated available power headroom. UE 115-b may transmit the power headroom report based on determining the timer or time period has expired at 620. UE 115-b may restart the timer based on transmitting the report if the timer is periodic. In some cases, the time interval may be a symbol period, a transmission occasion, a slot, or a combination thereof. The power headroom report may indicate a power headroom at a symbol index, a transmission occasion index, a slot index, or a combination thereof, corresponding to the time interval. In some cases, the power headroom report may indicate a current power headroom and the calculated available power headroom.

At 630, base station 105-b may schedule one or more uplink transmissions or messages at UE 115-b according to the calculated available power headroom. For example, base station 105-b may send scheduling information to UE 115-b to schedule uplink transmissions at UE 115-b according to the calculated available power headroom is relatively large. Base station 105-b may define a threshold level for transmitting messages according to both the relatively large power headroom and relatively small power headroom. In some cases, base station 105-b may use the power headroom report to request a transmission power UE 115-b uses to transmit across different frequency bands. A greater headroom means UE 115-b may support transmissions at a relatively higher transmit power level. A lower headroom, or less headroom, means UE 115-b may not support relatively high transmit power or may send transmissions at a relatively low or configured power level.

At 635, base station 105-b may receive the one or more scheduled messages from UE 115-b.

In some examples, UE 115-b may transmit the one or more scheduled messages at a transmit power level requested by base station 105-b. UE 115-b may provide power headroom information to the network, such that the network may request for UE 115-b to use corresponding transmit power levels for uplink transmissions. Additionally or alternatively, the network may use the power headroom information to determine when to schedule uplink carrier aggregation transmission by UE 115-b. Greater headroom means that UE 115-b may be capable of concurrent uplink transmission in multiple bands while maintaining a $P_{av,max}$ threshold.

Figure 7:
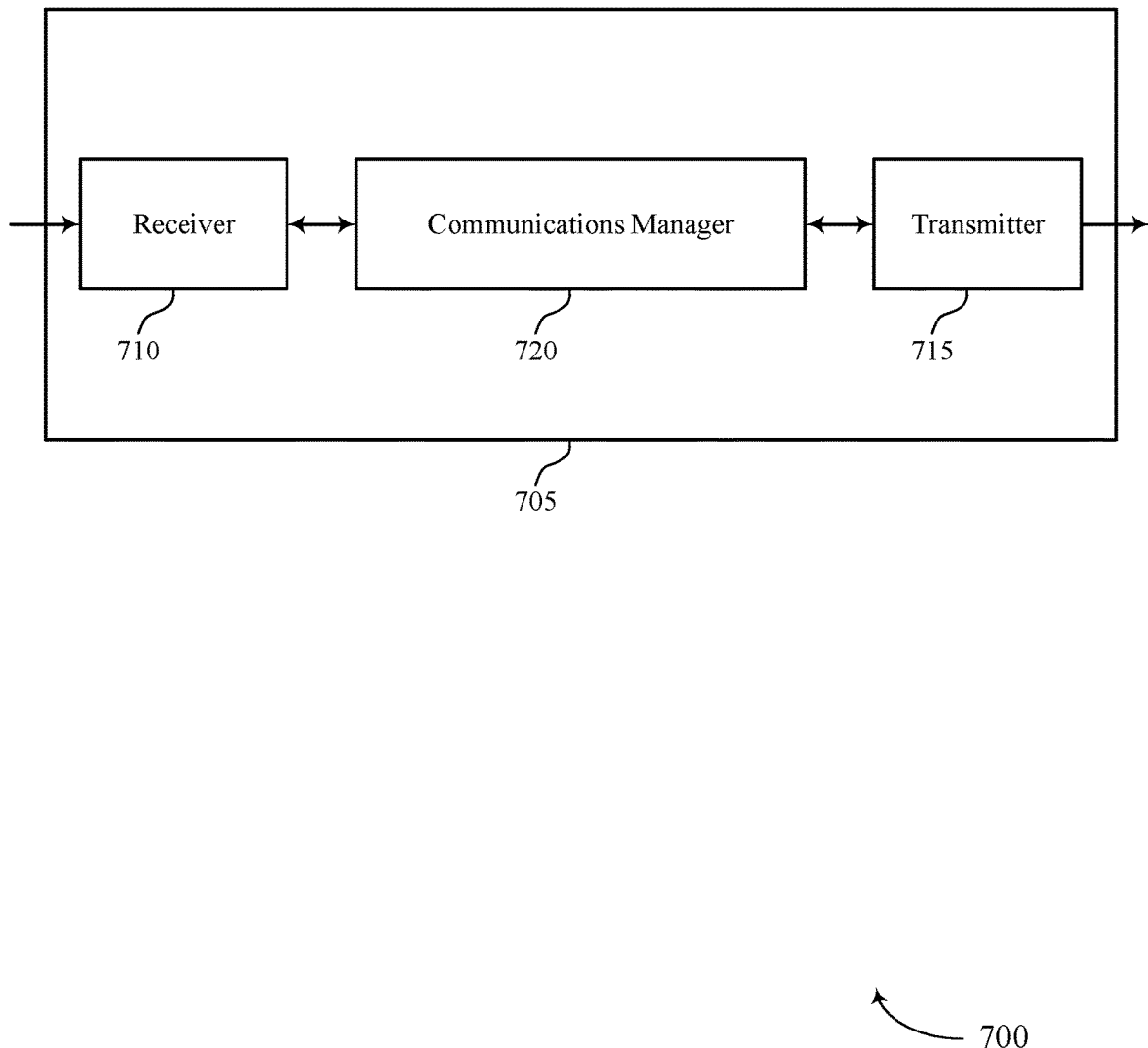
FIGS. 7 and 8 show diagrams of devices that support power headroom reporting for dynamic power aggregation in accordance with aspects of the present disclosure.

FIG. 7 shows a diagram 700 of a device 705 that supports power headroom reporting for dynamic power aggregation in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to power headroom reporting for dynamic power aggregation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to power headroom reporting for dynamic power aggregation). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of power headroom reporting for dynamic power aggregation as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, control signaling indicating a time interval over which to determine available power headroom relative to a transmission power threshold. The communications manager 720 may be configured as or otherwise support a means for calculating, based on the control signaling, the available power headroom relative to the transmission power threshold as a function of UE transmission power during the time interval. The communications manager 720 may be configured as or otherwise support a means for transmitting, to the base station, a power headroom report indicating the calculated available power headroom.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for a base station 105 to configure a time interval for a UE 115 to calculate an available power headroom for uplink carrier aggregation, which may cause reduced processing, reduced power consumption, more efficient utilization of communication resources, and the like.

Figure 8:
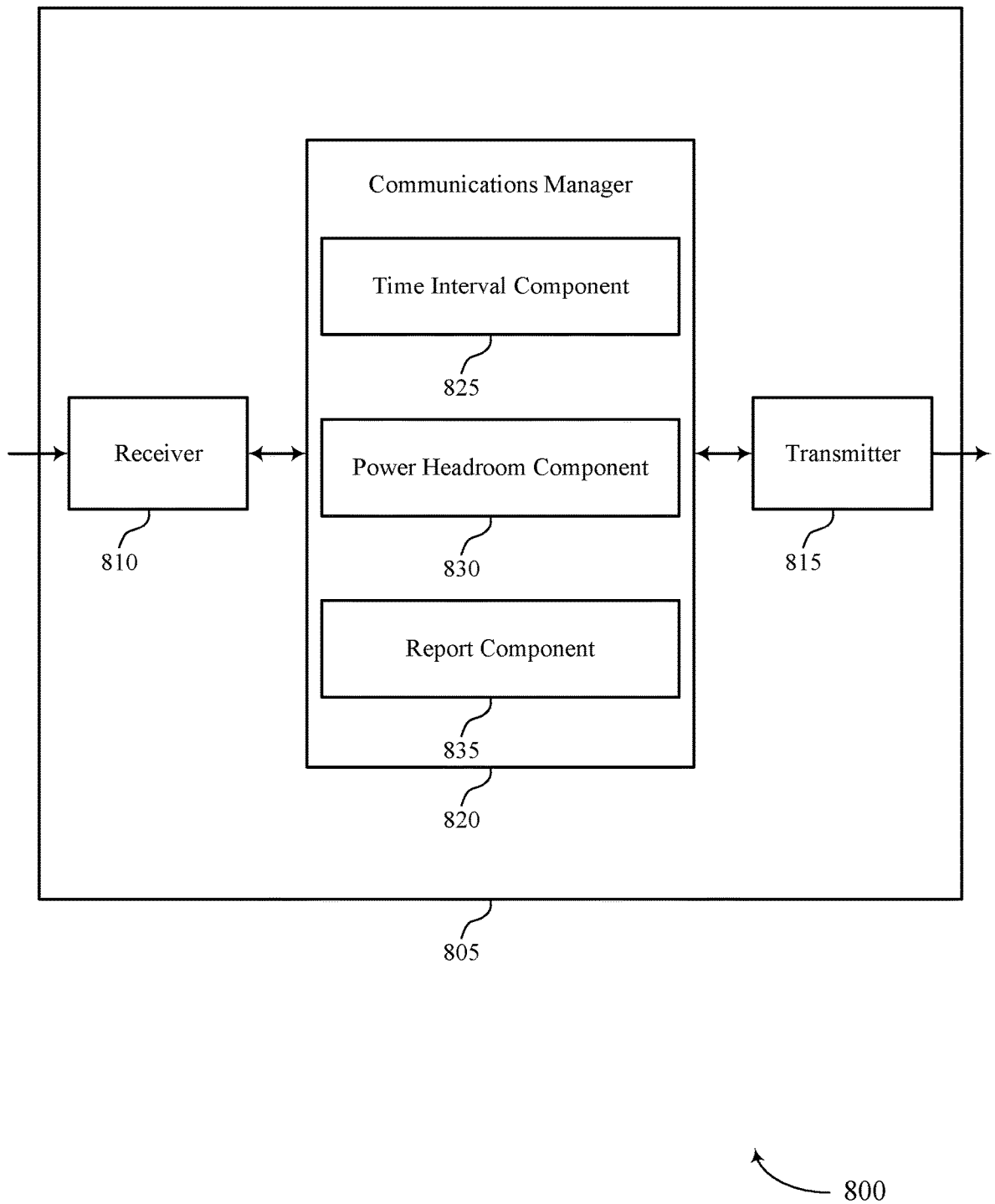

FIG. 8 shows a diagram 800 of a device 805 that supports power headroom reporting for dynamic power aggregation in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to power headroom reporting for dynamic power aggregation). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to power headroom reporting for dynamic power aggregation). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of power headroom reporting for dynamic power aggregation as described herein. For example, the communications manager 820 may include a time interval component 825, a power headroom component 830, a report component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The time interval component 825 may be configured as or otherwise support a means for receiving, from a base station, control signaling indicating a time interval over which to determine available power headroom relative to a transmission power threshold. The power headroom component 830 may be configured as or otherwise support a means for calculating, based on the control signaling, the available power headroom relative to the transmission power threshold as a function of UE transmission power during the time interval. The report component 835 may be configured as or otherwise support a means for transmitting, to the base station, a power headroom report indicating the calculated available power headroom.

Figure 9:
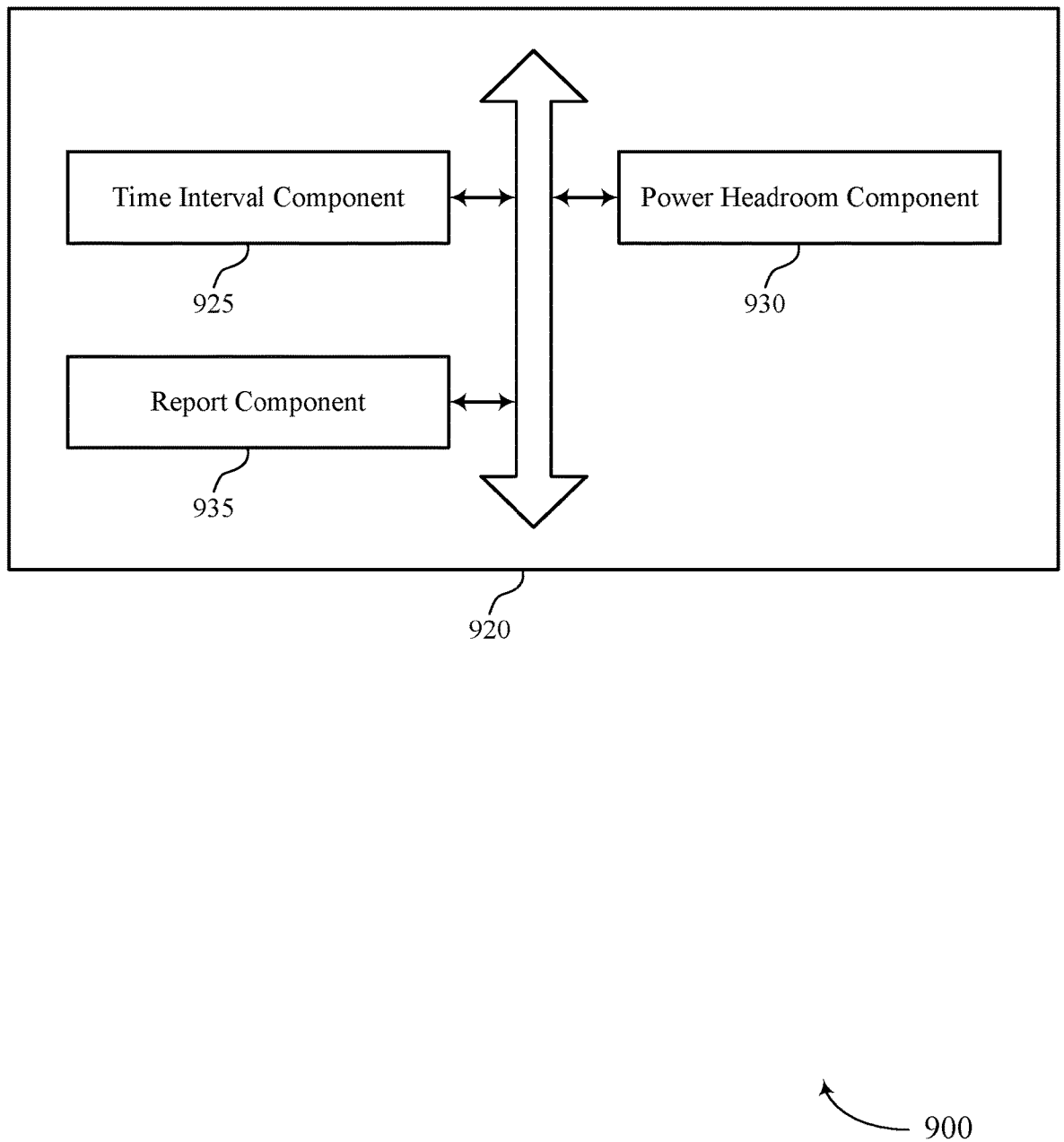
FIG. 9 shows a diagram of a communications manager that supports power headroom reporting for dynamic power aggregation in accordance with aspects of the present disclosure.

FIG. 9 shows a diagram 900 of a communications manager 920 that supports power headroom reporting for dynamic power aggregation in accordance with aspects of the present disclosure. The communications manager 920 may be an example of aspects of a communications manager 720, a communications manager 820, or both, as described herein. The communications manager 920, or various components thereof, may be an example of means for performing various aspects of power headroom reporting for dynamic power aggregation as described herein. For example, the communications manager 920 may include a time interval component 925, a power headroom component 930, a report component 935, or any combination thereof. Each of these components may communicate, directly or indirectly, with one another (e.g., via one or more buses).

The communications manager 920 may support wireless communication at a UE in accordance with examples as disclosed herein. The time interval component 925 may be configured as or otherwise support a means for receiving, from a base station, control signaling indicating a time interval over which to determine available power headroom relative to a transmission power threshold. The power headroom component 930 may be configured as or otherwise support a means for calculating, based on the control signaling, the available power headroom relative to the transmission power threshold as a function of UE transmission power during the time interval. The report component 935 may be configured as or otherwise support a means for transmitting, to the base station, a power headroom report indicating the calculated available power headroom.

In some examples, to support receiving the control signaling, the time interval component 925 may be configured as or otherwise support a means for receiving, during a control channel, a control message scheduling transmission of an uplink channel carrying the power headroom report, where the time interval over which the calculated available power headroom is calculated includes a transmission duration of the control channel.

In some examples, an end in time of the time interval over which the calculated available power headroom is calculated corresponds to an end in time of the control channel.

In some examples, to support receiving the control signaling, the time interval component 925 may be configured as or otherwise support a means for receiving radio resource control signaling configuring a resource allocation for transmission of an uplink channel carrying the power headroom report, where the time interval over which the calculated available power headroom is calculated is offset from the resource allocation by a defined amount of time.

In some examples, an end in time of the time interval over which the calculated available power headroom is calculated corresponds to the offset.

In some examples, to support receiving the control signaling, the report component 935 may be configured as or otherwise support a means for receiving the control signaling indicating a time period, where the power headroom report is transmitted upon expiration of the time period.

In some examples, to support receiving the control signaling, the report component 935 may be configured as or otherwise support a means for receiving the control signaling indicating a time period, where transmitting the power headroom report is based on upon expiration of the time period and the calculated available power headroom satisfying an expected available power headroom threshold, the calculated available power headroom satisfying a specific absorption rate threshold, or both.

In some examples, to support calculating the available power headroom, the power headroom component 930 may be configured as or otherwise support a means for calculating a statistical transmission power value across one or more uplink carriers within the time interval, where the calculated available power headroom indicates a difference between the transmission power threshold and the statistical transmission power value for the time interval.

In some examples, the time interval is a symbol period, a transmission occasion, a slot, or a combination thereof.

In some examples, the power headroom report indicates a power headroom at a symbol index, a transmission occasion index, a slot index, or a combination thereof, corresponding to the time interval.

In some examples, to support receiving the control signaling, the power headroom component 930 may be configured as or otherwise support a means for receiving the control signaling indicating to calculate available power headroom for at least one frequency range of a set of multiple frequency ranges associated with one or more uplink transmissions by the UE, for at least one frequency band of a set of multiple frequency bands associated with the one or more uplink transmissions, for at least one cell group of a set of multiple cell groups associated with the base station, or a combination thereof.

In some examples, the power headroom report indicates a current power headroom and the calculated available power headroom.

In some examples, to support receiving the control signaling, the time interval component 925 may be configured as or otherwise support a means for receiving the control signaling including one or more information elements indicating a duration of the time interval, a power headroom reporting time period, a power headroom prohibition time period, or any combination thereof.

Figure 10:
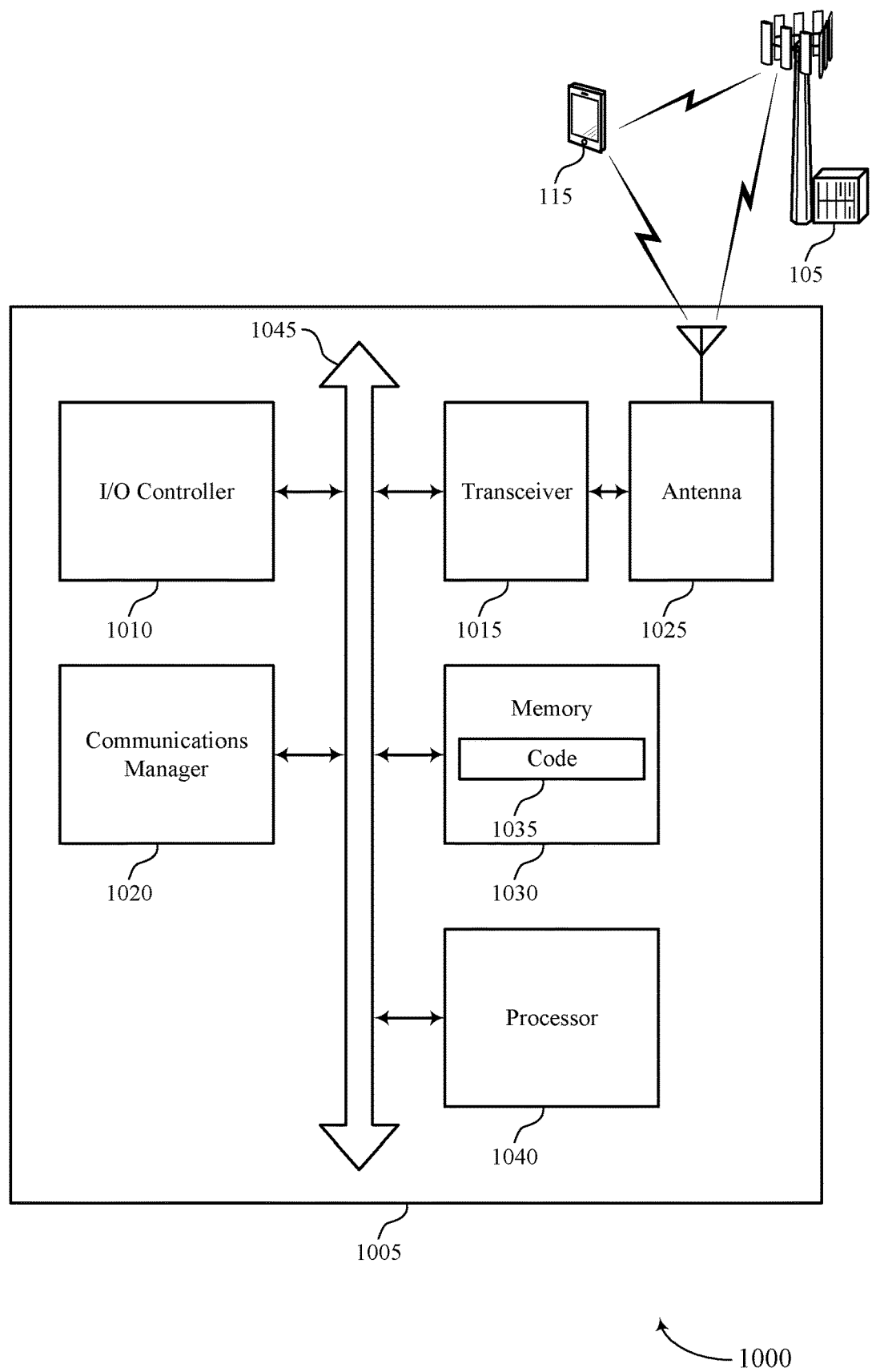
FIG. 10 shows a diagram of a system including a device that supports power headroom reporting for dynamic power aggregation in accordance with aspects of the present disclosure.

FIG. 10 shows a diagram of a system 1000 including a device 1005 that supports power headroom reporting for dynamic power aggregation in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005.

In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting power headroom reporting for dynamic power aggregation). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, control signaling indicating a time interval over which to determine available power headroom relative to a transmission power threshold. The communications manager 1020 may be configured as or otherwise support a means for calculating, based on the control signaling, the available power headroom relative to the transmission power threshold as a function of UE transmission power during the time interval. The communications manager 1020 may be configured as or otherwise support a means for transmitting, to the base station, a power headroom report indicating the calculated available power headroom.

By including or configuring the communications manager 1020 in accordance with examples as described herein, the device 1005 may support techniques for a base station 105 to configure a time interval for a UE 115 to calculate an available power headroom for uplink carrier aggregation, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of power headroom reporting for dynamic power aggregation as described herein, or the processor 1040 and the memory 1030 may be otherwise configured to perform or support such operations.

Figure 11:
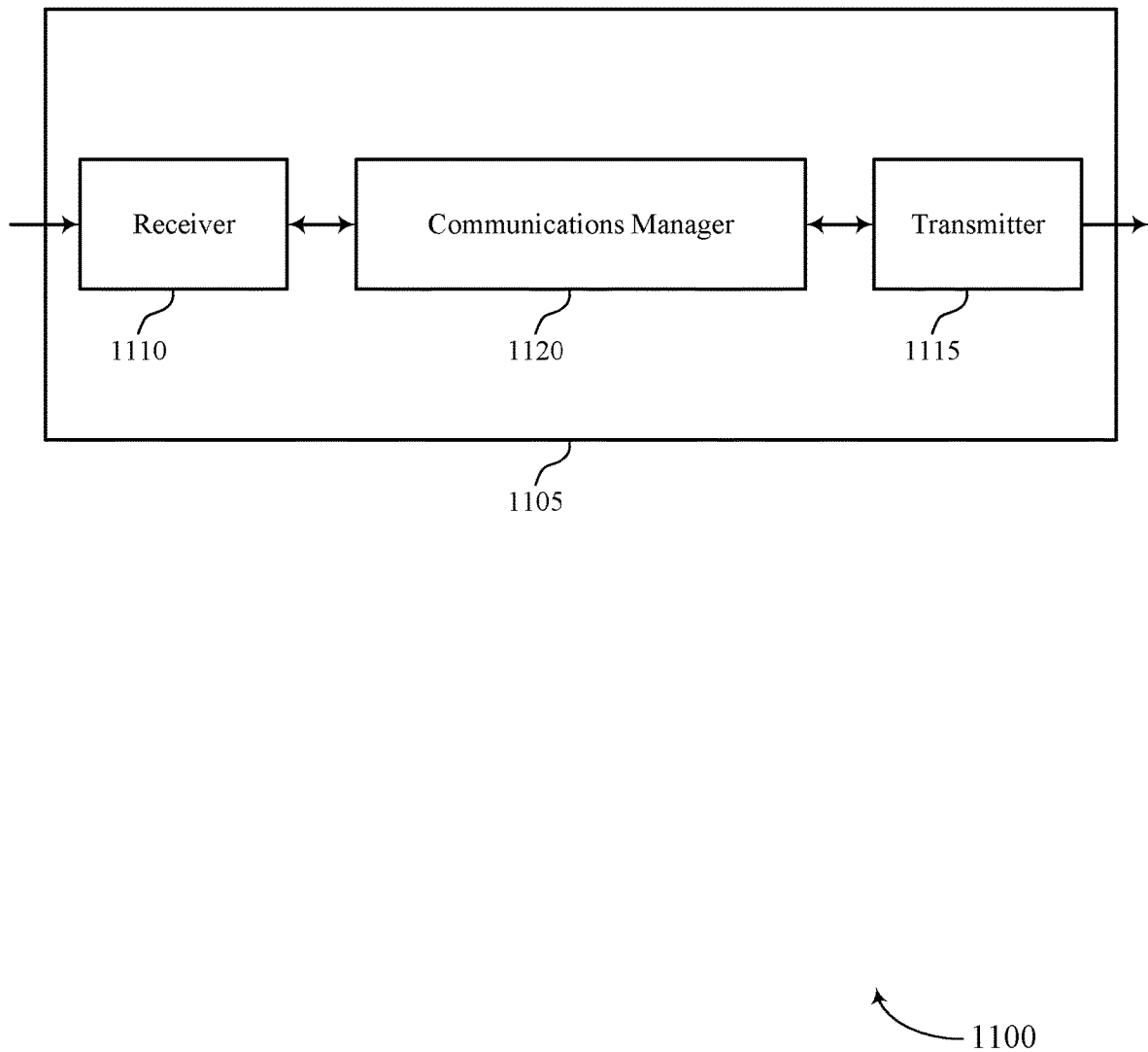
FIGS. 11 and 12 show diagrams of devices that support power headroom reporting for dynamic power aggregation in accordance with aspects of the present disclosure.

FIG. 11 shows a diagram 1100 of a device 1105 that supports power headroom reporting for dynamic power aggregation in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to power headroom reporting for dynamic power aggregation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to power headroom reporting for dynamic power aggregation). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of power headroom reporting for dynamic power aggregation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, control signaling indicating a time interval over which to determine available power headroom relative to a transmission power threshold. The communications manager 1120 may be configured as or otherwise support a means for receiving, from the UE, a power headroom report indicating a calculated available power headroom. The communications manager 1120 may be configured as or otherwise support a means for scheduling one or more uplink messages at the UE according to the calculated available power headroom.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for a base station 105 to configure a time interval for a UE 115 to calculate an available power headroom for uplink carrier aggregation, which may cause reduced processing, reduced power consumption, more efficient utilization of communication resources, and the like.

Figure 12:
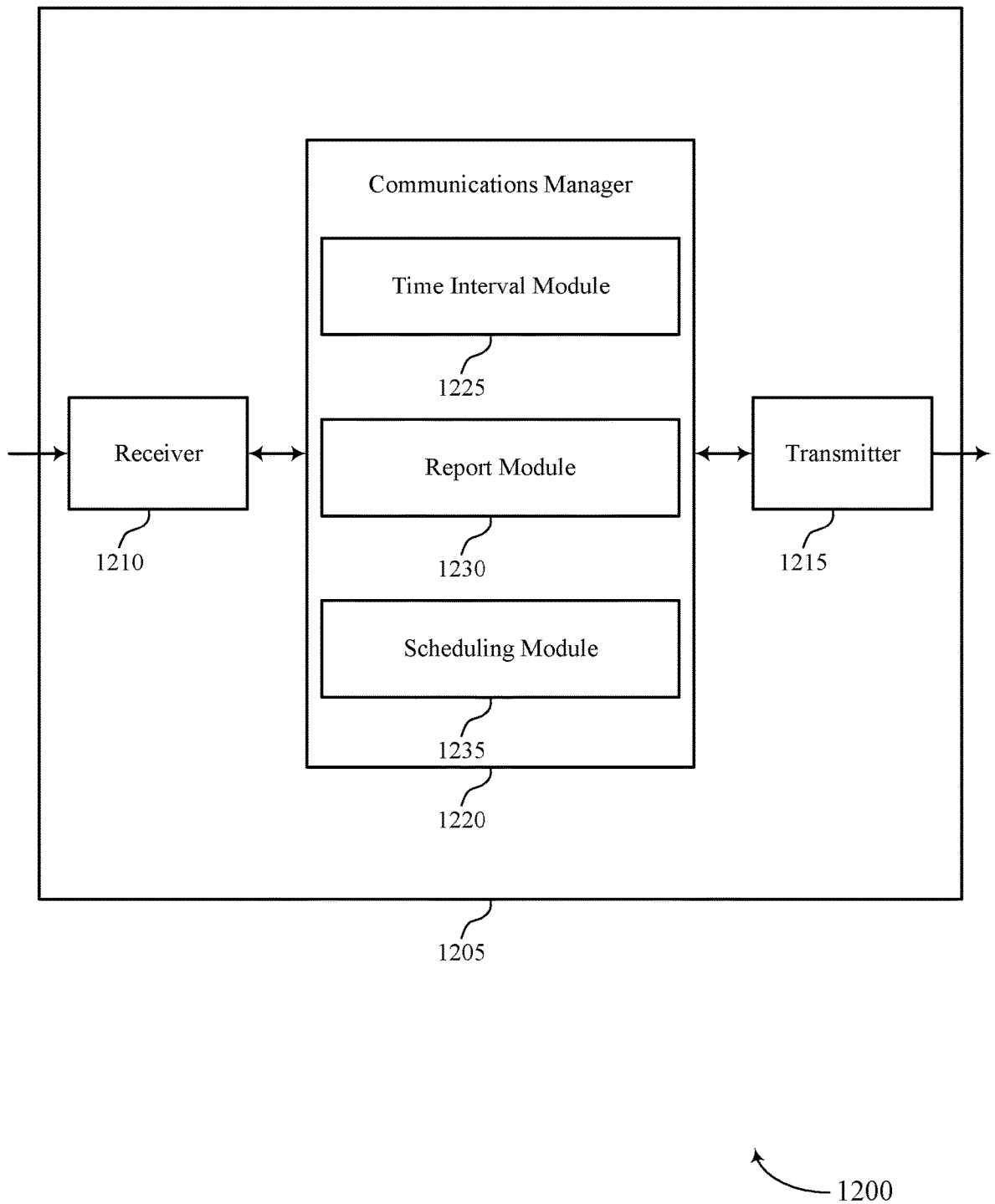

FIG. 12 shows a diagram 1200 of a device 1205 that supports power headroom reporting for dynamic power aggregation in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to power headroom reporting for dynamic power aggregation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to power headroom reporting for dynamic power aggregation). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of power headroom reporting for dynamic power aggregation as described herein. For example, the communications manager 1220 may include a time interval module 1225, a report module 1230, a scheduling module 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The time interval module 1225 may be configured as or otherwise support a means for transmitting, to a UE, control signaling indicating a time interval over which to determine available power headroom relative to a transmission power threshold. The report module 1230 may be configured as or otherwise support a means for receiving, from the UE, a power headroom report indicating a calculated available power headroom. The scheduling module 1235 may be configured as or otherwise support a means for scheduling one or more uplink messages at the UE according to the calculated available power headroom.

Figure 13:
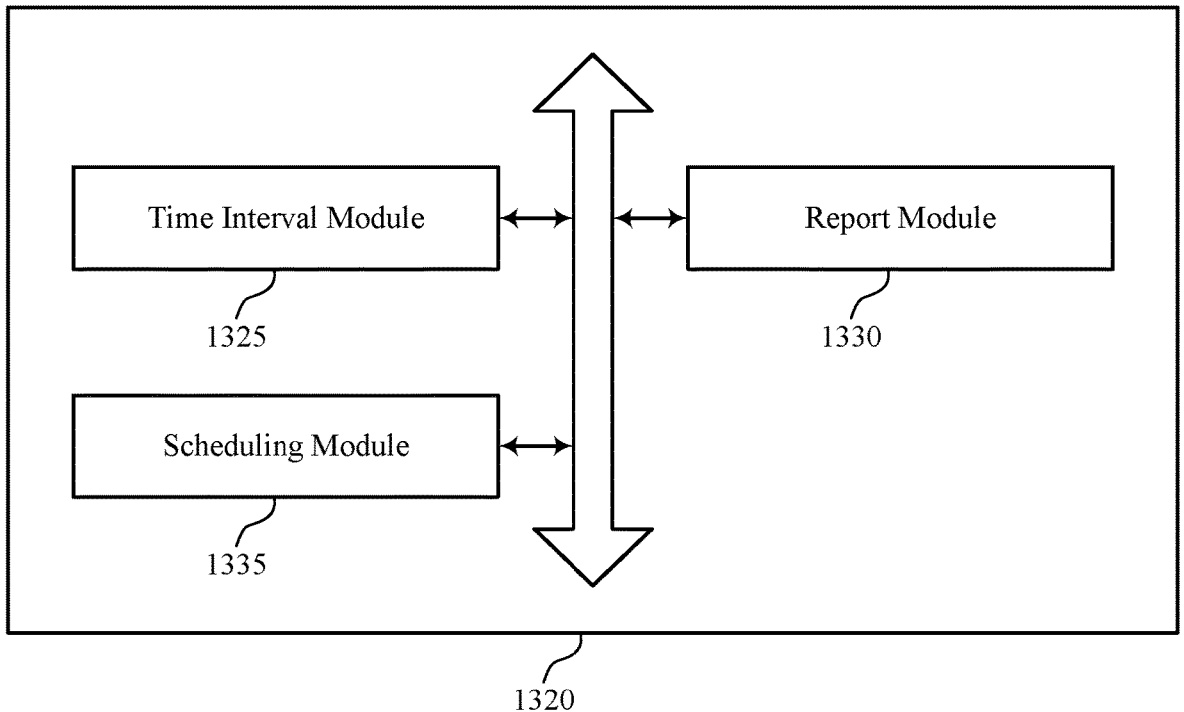
FIG. 13 shows a diagram of a communications manager that supports power headroom reporting for dynamic power aggregation in accordance with aspects of the present disclosure.

FIG. 13 shows a diagram 1300 of a communications manager 1320 that supports power headroom reporting for dynamic power aggregation in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of power headroom reporting for dynamic power aggregation as described herein. For example, the communications manager 1320 may include a time interval module 1325, a report module 1330, a scheduling module 1335, or any combination thereof. Each of these components may communicate, directly or indirectly, with one another (e.g., via one or more buses).

The communications manager 1320 may support wireless communication at a base station in accordance with examples as disclosed herein. The time interval module 1325 may be configured as or otherwise support a means for transmitting, to a UE, control signaling indicating a time interval over which to determine available power headroom relative to a transmission power threshold. The report module 1330 may be configured as or otherwise support a means for receiving, from the UE, a power headroom report indicating a calculated available power headroom. The scheduling module 1335 may be configured as or otherwise support a means for scheduling one or more uplink messages at the UE according to the calculated available power headroom.

In some examples, the time interval module 1325 may be configured as or otherwise support a means for transmitting, during a control channel, a control message scheduling transmission of an uplink channel carrying the power headroom report, where the time interval over which the calculated available power headroom is calculated includes a transmission duration of the control channel.

In some examples, an end in time of the time interval over which the calculated available power headroom is calculated corresponds to an end in time of the control channel.

In some examples, the time interval module 1325 may be configured as or otherwise support a means for transmitting radio resource control signaling configuring a resource allocation for transmission of an uplink channel carrying the power headroom report, where the time interval over which the calculated available power headroom is calculated is offset from the resource allocation by a defined amount of time.

In some examples, an end in time of the time interval over which the calculated available power headroom is calculated corresponds to the offset.

In some examples, to support transmitting the control signaling, the report module 1330 may be configured as or otherwise support a means for transmitting the control signaling indicating a time period, where the power headroom report is received upon expiration of the time period.

In some examples, to support transmitting the control signaling, the report module 1330 may be configured as or otherwise support a means for transmitting the control signaling indicating a time period, where receiving the power headroom report is based on upon expiration of the time period and the calculated available power headroom satisfying an expected available power headroom threshold, the calculated available power headroom satisfying a specific absorption rate threshold, or both.

In some examples, the time interval is a symbol period, a transmission occasion, a slot, or a combination thereof.

In some examples, the power headroom report indicates a power headroom at a symbol index, a transmission occasion index, a slot index, or a combination thereof, corresponding to the time interval.

In some examples, to support scheduling the one or more uplink messages, the scheduling module 1335 may be configured as or otherwise support a means for scheduling a set of multiple uplink messages at the UE based on the calculated available power headroom satisfying a threshold.

In some examples, to support scheduling the one or more uplink messages, the scheduling module 1335 may be configured as or otherwise support a means for scheduling a single uplink message at the UE based on the calculated available power headroom satisfying a threshold.

In some examples, the power headroom report includes a current power headroom at the UE and the calculated available power headroom.

In some examples, to support transmitting the control signaling, the time interval module 1325 may be configured as or otherwise support a means for transmitting the control signaling including one or more information elements indicating a duration of the time interval, a power headroom reporting time period, a power headroom prohibition time period, or any combination thereof.

Figure 14:
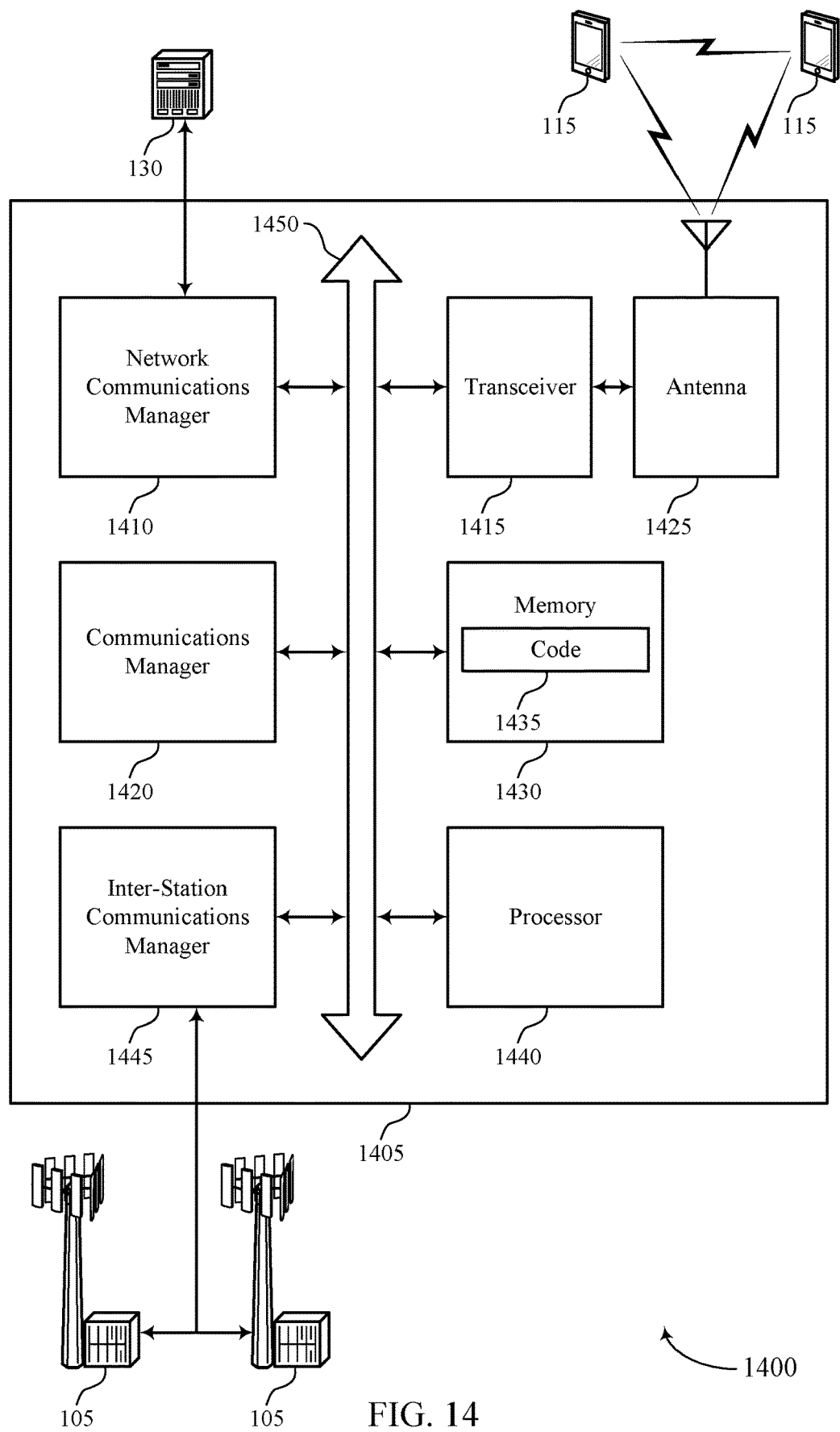
FIG. 14 shows a diagram of a system including a device that supports power headroom reporting for dynamic power aggregation in accordance with aspects of the present disclosure.

FIG. 14 shows a diagram of a system 1400 including a device 1405 that supports power headroom reporting for dynamic power aggregation in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting power headroom reporting for dynamic power aggregation). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, control signaling indicating a time interval over which to determine available power headroom relative to a transmission power threshold. The communications manager 1420 may be configured as or otherwise support a means for receiving, from the UE, a power headroom report indicating a calculated available power headroom. The communications manager 1420 may be configured as or otherwise support a means for scheduling one or more uplink messages at the UE according to the calculated available power headroom.

By including or configuring the communications manager 1420 in accordance with examples as described herein, the device 1405 may support techniques for a base station 105 to configure a time interval for a UE 115 to calculate an available power headroom for uplink carrier aggregation, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of power headroom reporting for dynamic power aggregation as described herein, or the processor 1440 and the memory 1430 may be otherwise configured to perform or support such operations.

Figure 15:
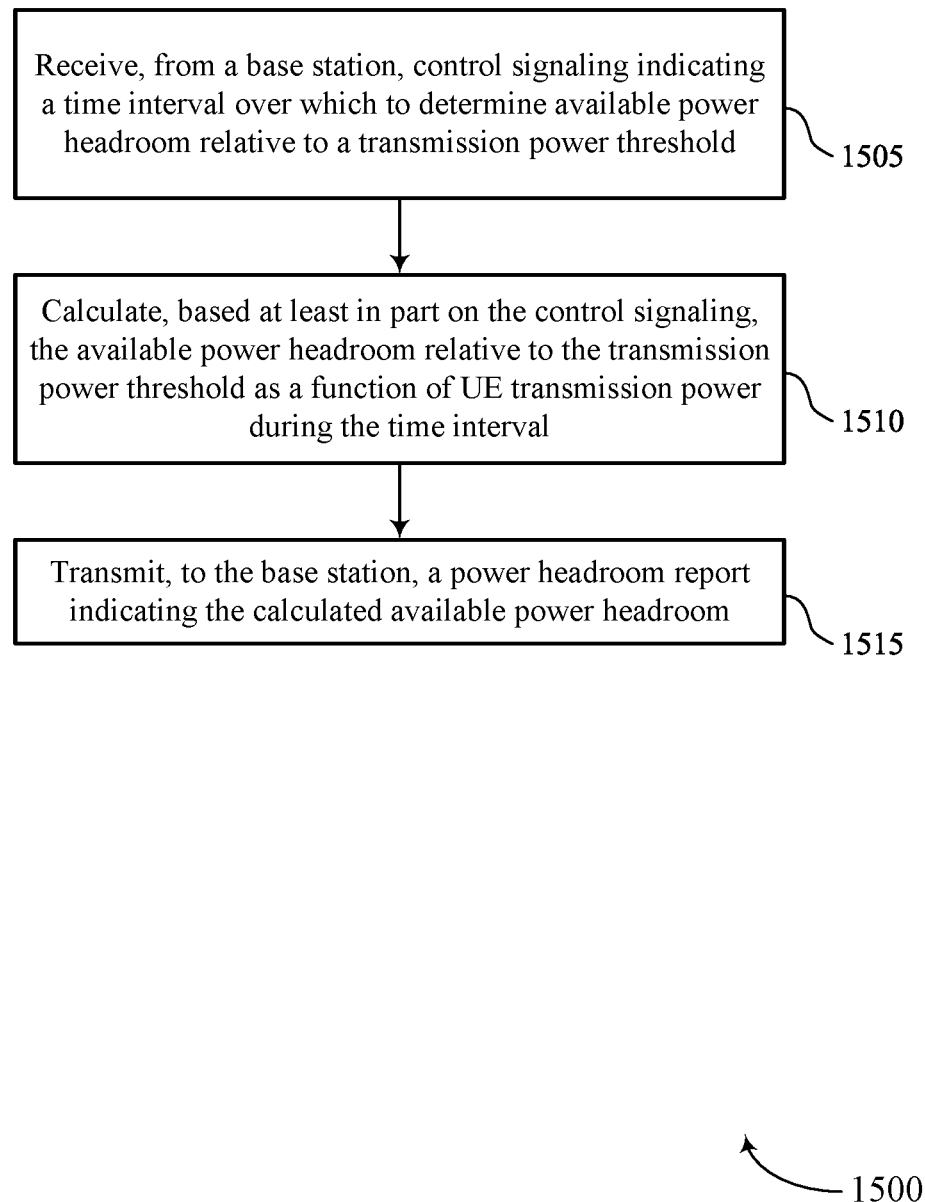
FIGS. 15 through 19 show flowcharts illustrating methods that support power headroom reporting for dynamic power aggregation in accordance with aspects of the present disclosure.

FIG. 15 shows a flowchart illustrating a method 1500 that supports power headroom reporting for dynamic power aggregation in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling indicating a time interval over which to determine available power headroom relative to a transmission power threshold. The operations of 1505 may be performed in accordance with examples as disclosed herein. In some examples, aspects of the operations of 1505 may be performed by a time interval component 925 as described with reference to FIG. 9.

At 1510, the method may include calculating, based on the control signaling, the available power headroom relative to the transmission power threshold as a function of UE transmission power during the time interval. The operations of 1510 may be performed in accordance with examples as disclosed herein. In some examples, aspects of the operations of 1510 may be performed by a power headroom component 930 as described with reference to FIG. 9.

At 1515, the method may include transmitting, to the base station, a power headroom report indicating the calculated available power headroom. The operations of 1515 may be performed in accordance with examples as disclosed herein. In some examples, aspects of the operations of 1515 may be performed by a report component 935 as described with reference to FIG. 9.

Figure 16:
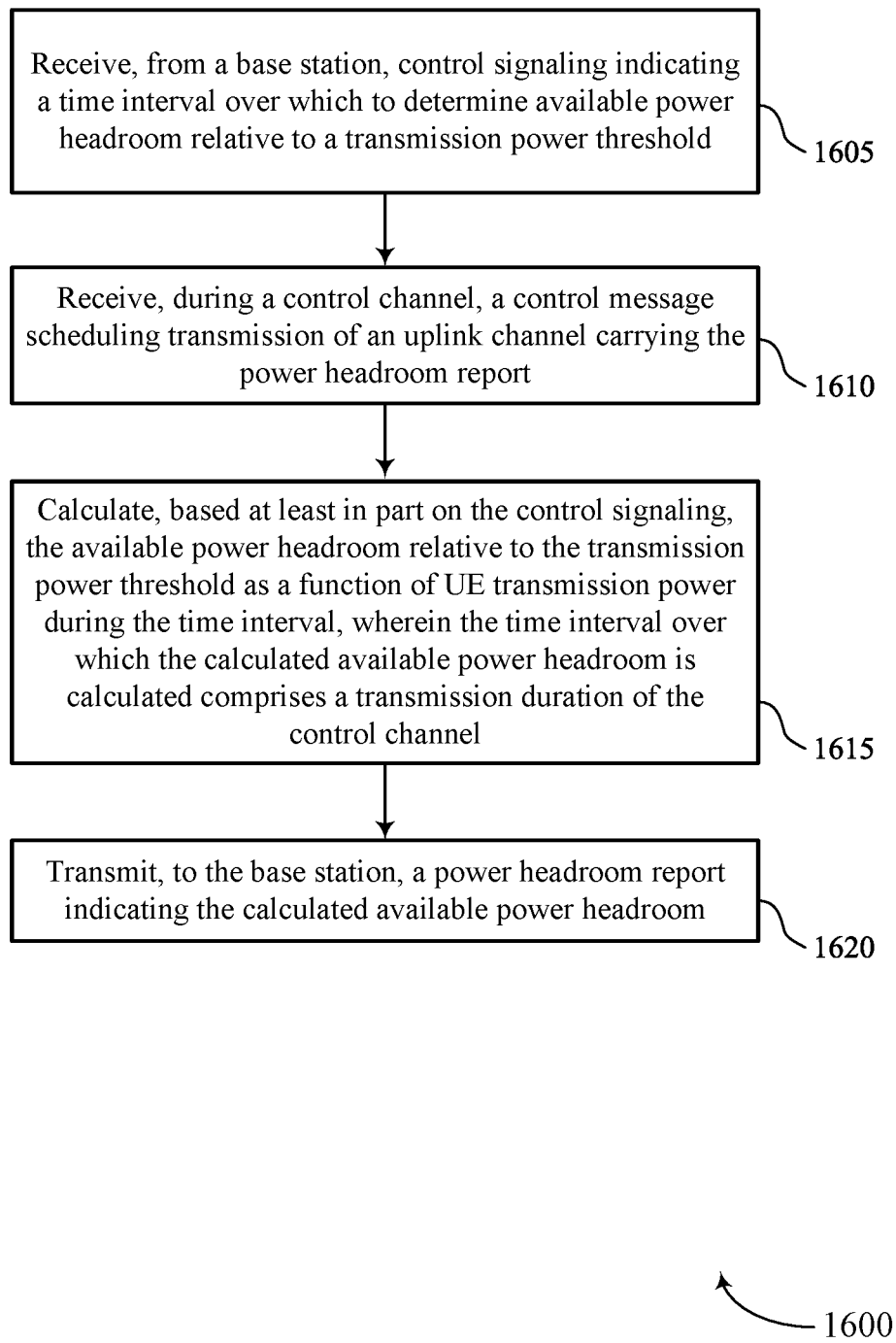

FIG. 16 shows a flowchart illustrating a method 1600 that supports power headroom reporting for dynamic power aggregation in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling indicating a time interval over which to determine available power headroom relative to a transmission power threshold. The operations of 1605 may be performed in accordance with examples as disclosed herein. In some examples, aspects of the operations of 1605 may be performed by a time interval component 925 as described with reference to FIG. 9.

At 1610, the method may include receiving, during a control channel, a control message scheduling transmission of an uplink channel carrying the power headroom report. The operations of 1610 may be performed in accordance with examples as disclosed herein. In some examples, aspects of the operations of 1610 may be performed by a time interval component 925 as described with reference to FIG. 9.

At 1615, the method may include calculating, based on the control signaling, the available power headroom relative to the transmission power threshold as a function of UE transmission power during the time interval, where the time interval over which the calculated available power headroom is calculated includes a transmission duration of the control channel. The operations of 1615 may be performed in accordance with examples as disclosed herein. In some examples, aspects of the operations of 1615 may be performed by a power headroom component 930 as described with reference to FIG. 9.

At 1620, the method may include transmitting, to the base station, a power headroom report indicating the calculated available power headroom. The operations of 1620 may be performed in accordance with examples as disclosed herein. In some examples, aspects of the operations of 1620 may be performed by a report component 935 as described with reference to FIG. 9.

Figure 17:
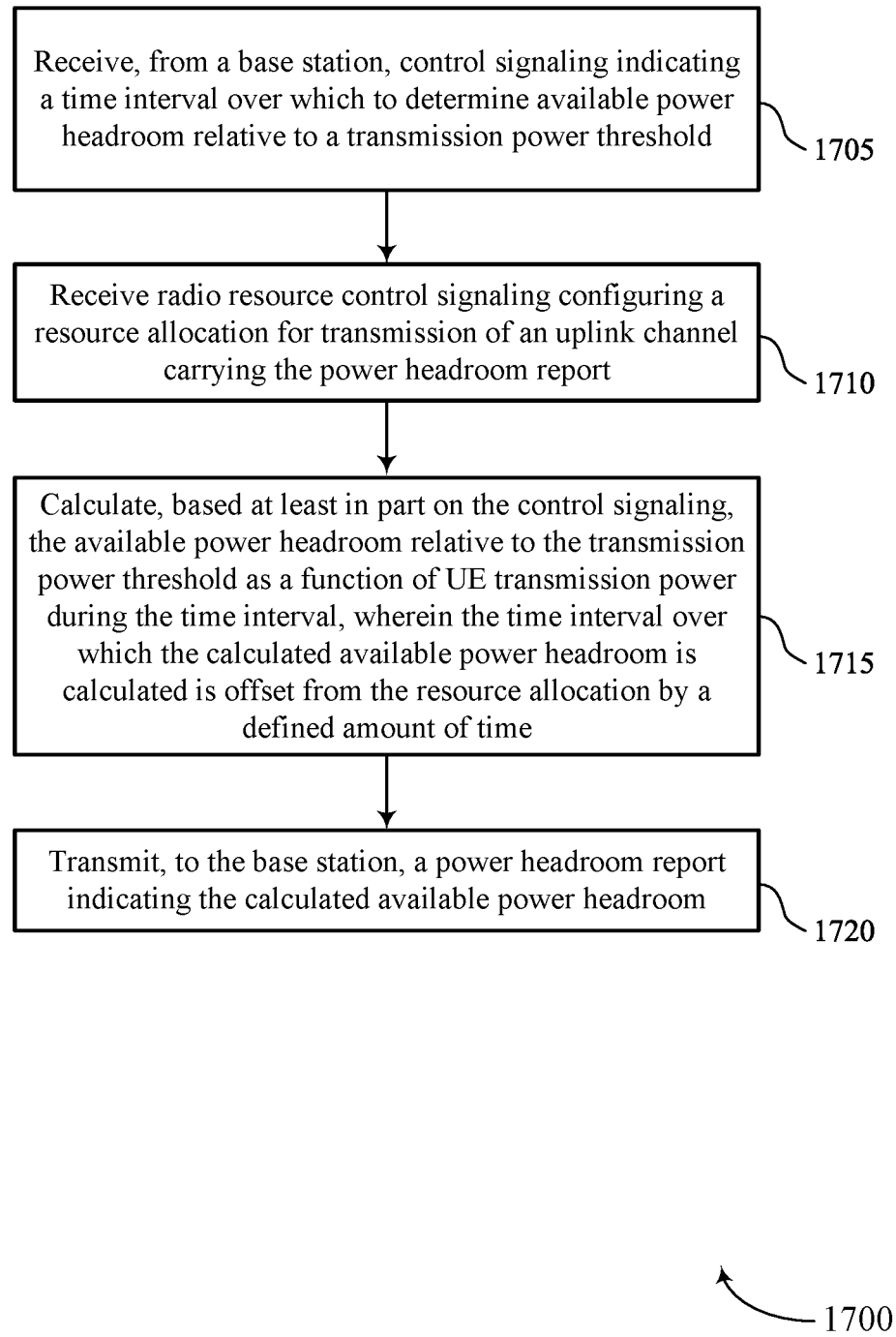

FIG. 17 shows a flowchart illustrating a method 1700 that supports power headroom reporting for dynamic power aggregation in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, control signaling indicating a time interval over which to determine available power headroom relative to a transmission power threshold. The operations of 1705 may be performed in accordance with examples as disclosed herein. In some examples, aspects of the operations of 1705 may be performed by a time interval component 925 as described with reference to FIG. 9.

At 1710, the method may include receiving radio resource control signaling configuring a resource allocation for transmission of an uplink channel carrying the power headroom report, where the time interval over which the calculated available power headroom is calculated is offset from the resource allocation by a defined amount of time. The operations of 1710 may be performed in accordance with examples as disclosed herein. In some examples, aspects of the operations of 1710 may be performed by a time interval component 925 as described with reference to FIG. 9.

At 1715, the method may include calculating, based on the control signaling, the available power headroom relative to the transmission power threshold as a function of UE transmission power during the time interval. The operations of 1715 may be performed in accordance with examples as disclosed herein. In some examples, aspects of the operations of 1715 may be performed by a power headroom component 930 as described with reference to FIG. 9.

At 1720, the method may include transmitting, to the base station, a power headroom report indicating the calculated available power headroom. The operations of 1720 may be performed in accordance with examples as disclosed herein. In some examples, aspects of the operations of 1720 may be performed by a report component 935 as described with reference to FIG. 9.

Figure 18:
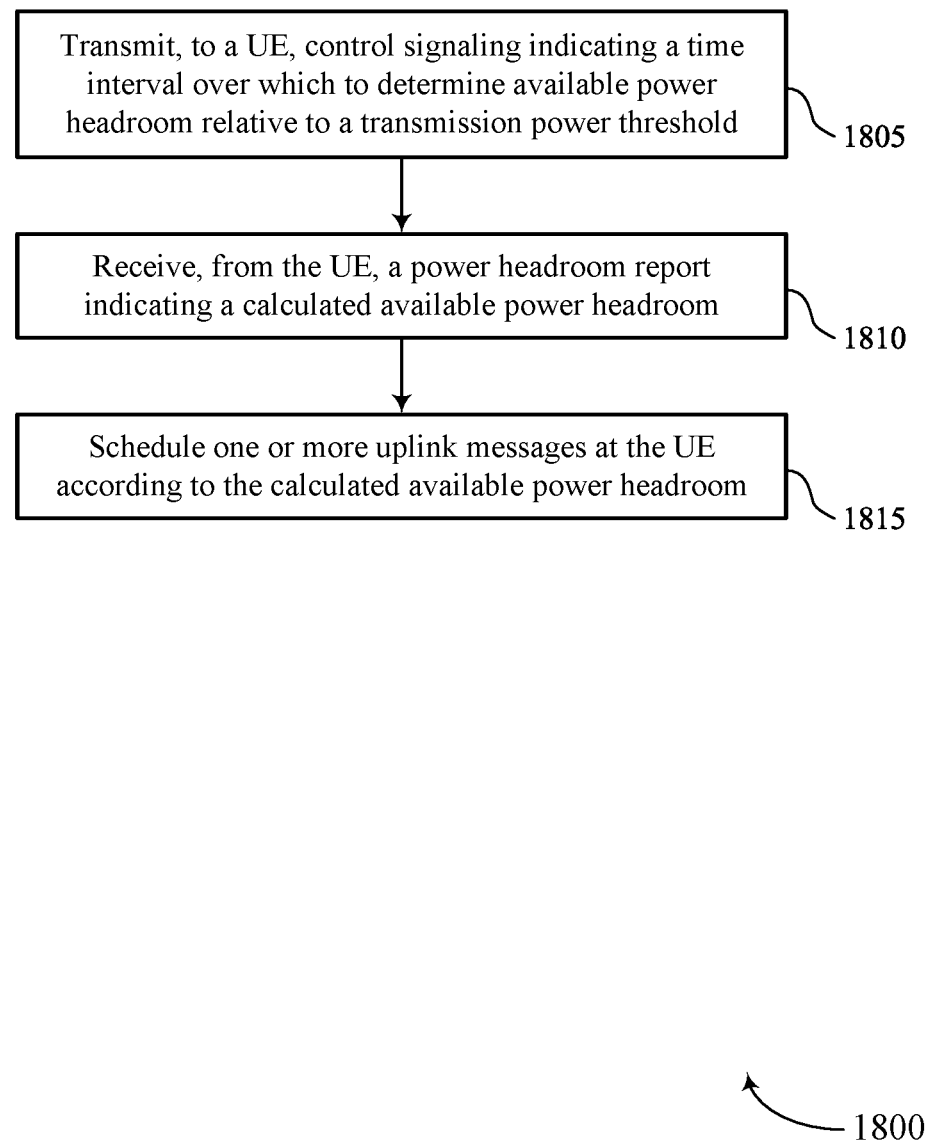

FIG. 18 shows a flowchart illustrating a method 1800 that supports power headroom reporting for dynamic power aggregation in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, control signaling indicating a time interval over which to determine available power headroom relative to a transmission power threshold. The operations of 1805 may be performed in accordance with examples as disclosed herein. In some examples, aspects of the operations of 1805 may be performed by a time interval module 1325 as described with reference to FIG. 13.

At 1810, the method may include receiving, from the UE, a power headroom report indicating a calculated available power headroom. The operations of 1810 may be performed in accordance with examples as disclosed herein. In some examples, aspects of the operations of 1810 may be performed by a report module 1330 as described with reference to FIG. 13.

At 1815, the method may include scheduling one or more uplink messages at the UE according to the calculated available power headroom. The operations of 1815 may be performed in accordance with examples as disclosed herein. In some examples, aspects of the operations of 1815 may be performed by a scheduling module 1335 as described with reference to FIG. 13.

Figure 19:
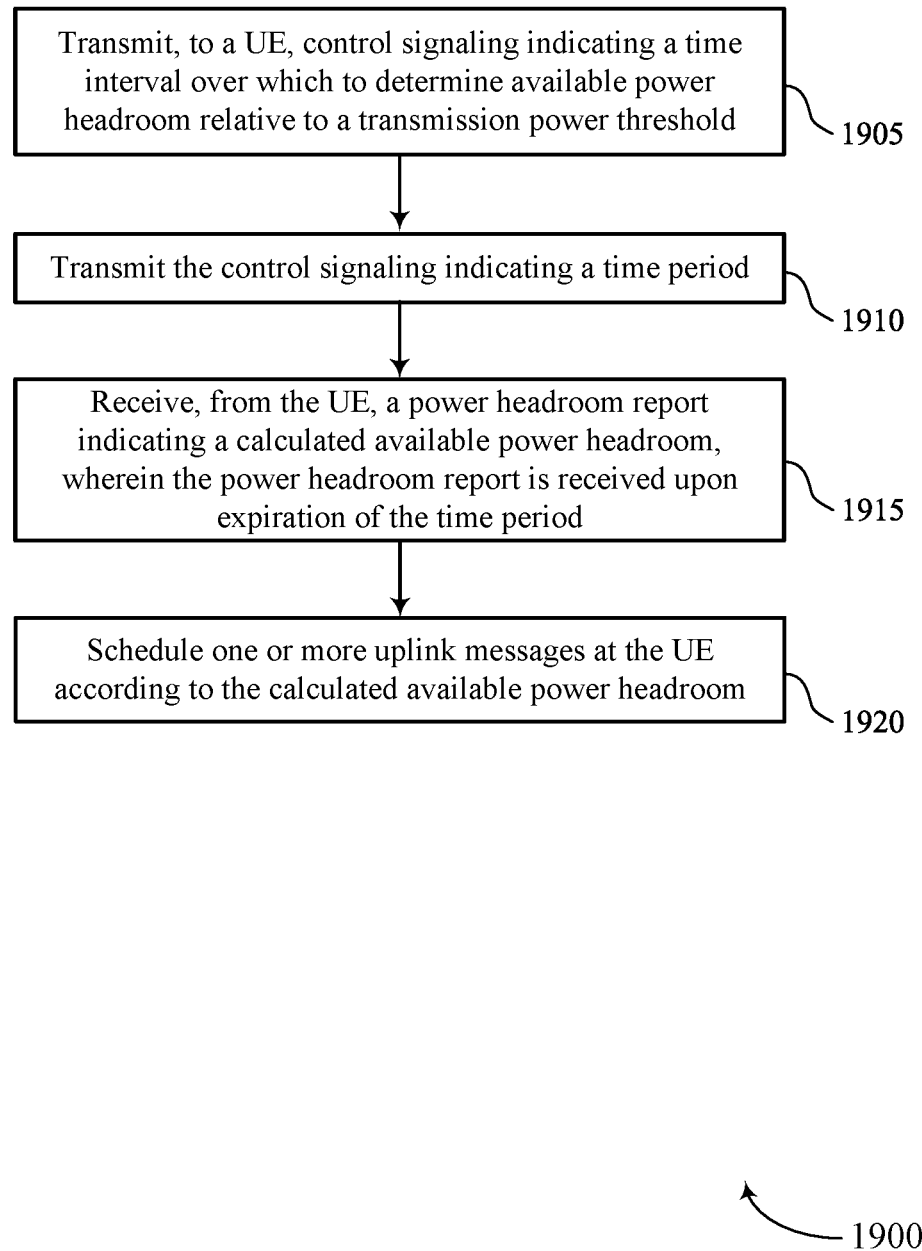

FIG. 19 shows a flowchart illustrating a method 1900 that supports power headroom reporting for dynamic power aggregation in accordance with aspects of the present disclosure. The operations of the method 1900 may be implemented by a base station or its components as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, control signaling indicating a time interval over which to determine available power headroom relative to a transmission power threshold. The operations of 1905 may be performed in accordance with examples as disclosed herein. In some examples, aspects of the operations of 1905 may be performed by a time interval module 1325 as described with reference to FIG. 13.

At 1910, the method may include transmitting the control signaling indicating a time period. The operations of 1910 may be performed in accordance with examples as disclosed herein. In some examples, aspects of the operations of 1910 may be performed by a report module 1330 as described with reference to FIG. 13.

At 1915, the method may include receiving, from the UE, a power headroom report indicating a calculated available power headroom, where the power headroom report is received upon expiration of the time period. The operations of 1915 may be performed in accordance with examples as disclosed herein. In some examples, aspects of the operations of 1915 may be performed by a report module 1330 as described with reference to FIG. 13.

At 1920, the method may include scheduling one or more uplink messages at the UE according to the calculated available power headroom. The operations of 1920 may be performed in accordance with examples as disclosed herein. In some examples, aspects of the operations of 1920 may be performed by a scheduling module 1335 as described with reference to FIG. 13.

The following provides an overview of aspects of the present disclosure:

Aspect 1: A method for wireless communication at a UE, comprising: receiving, from a base station, control signaling indicating a time interval over which to determine available power headroom relative to a transmission power threshold; calculating, based at least in part on the control signaling, the available power headroom relative to the transmission power threshold as a function of UE transmission power during the time interval; and transmitting, to the base station, a power headroom report indicating the calculated available power headroom.

Aspect 2: The method of aspect 1, wherein receiving the control signaling comprises: receiving, during a control channel, a control message scheduling transmission of an uplink channel carrying the power headroom report, wherein the time interval over which the calculated available power headroom is calculated comprises a transmission duration of the control channel.

Aspect 3: The method of aspect 2, wherein an end in time of the time interval over which the calculated available power headroom is calculated corresponds to an end in time of the control channel.

Aspect 4: The method of aspect 1, wherein receiving the control signaling comprises: receiving radio resource control signaling configuring a resource allocation for transmission of an uplink channel carrying the power headroom report, wherein the time interval over which the calculated available power headroom is calculated is offset from the resource allocation by a defined amount of time.

Aspect 5: The method of aspect 4, wherein an end in time of the time interval over which the calculated available power headroom is calculated corresponds to the defined amount of time.

Aspect 6: The method of any of aspects 1 through 5, wherein receiving the control signaling comprises: receiving the control signaling indicating a time period, wherein the power headroom report is transmitted upon expiration of the time period.

Aspect 7: The method of any of aspects 1 through 6, wherein receiving the control signaling comprises: receiving the control signaling indicating a time period, wherein transmitting the power headroom report is based at least in part on upon expiration of the time period and the calculated available power headroom satisfying an expected available power headroom threshold, the calculated available power headroom satisfying a specific absorption rate threshold, or both.

Aspect 8: The method of any of aspects 1 through 7, wherein calculating the available power headroom further comprises: calculating a statistical transmission power value across one or more uplink carriers within the time interval, wherein the calculated available power headroom indicates a difference between the transmission power threshold and the statistical transmission power value for the time interval.

Aspect 9: The method of any of aspects 1 through 8, wherein the time interval is a symbol period, a transmission occasion, a slot, or a combination thereof.

Aspect 10: The method of any of aspects 1 through 9, wherein the power headroom report indicates a power headroom at a symbol index, a transmission occasion index, a slot index, or a combination thereof, corresponding to the time interval.

Aspect 11: The method of any of aspects 1 through 10, wherein receiving the control signaling comprises: receiving the control signaling indicating to calculate the available power headroom for at least one frequency range of a plurality of frequency ranges associated with one or more uplink transmissions by the UE, for at least one frequency band of a plurality of frequency bands associated with the one or more uplink transmissions, for at least one cell group of a plurality of cell groups associated with the base station, or a combination thereof.

Aspect 12: The method of any of aspects 1 through 11, wherein the power headroom report indicates a current power headroom and the calculated available power headroom.

Aspect 13: The method of any of aspects 1 through 12, wherein receiving the control signaling comprises: receiving the control signaling comprising one or more information elements indicating a duration of the time interval, a power headroom reporting time period, a power headroom prohibition time period, or any combination thereof.

Aspect 14: A method for wireless communication at a base station, comprising: transmitting, to a UE, control signaling indicating a time interval over which to determine available power headroom relative to a transmission power threshold; receiving, from the UE, a power headroom report indicating a calculated available power headroom; and scheduling one or more uplink messages at the UE according to the calculated available power headroom.

Aspect 15: The method of aspect 14 further comprising: transmitting, during a control channel, a control message scheduling transmission of an uplink channel carrying the power headroom report, wherein the time interval over which the calculated available power headroom is calculated comprises a transmission duration of the control channel.

Aspect 16: The method of aspect 15, wherein an end in time of the time interval over which the calculated available power headroom is calculated corresponds to an end in time of the control channel.

Aspect 17: The method of aspect 14 further comprising: transmitting radio resource control signaling configuring a resource allocation for transmission of an uplink channel carrying the power headroom report, wherein the time interval over which the calculated available power headroom is calculated is offset from the resource allocation by a defined amount of time.

Aspect 18: The method of aspect 17, wherein an end in time of the time interval over which the calculated available power headroom is calculated corresponds to the defined amount of time.

Aspect 19: The method of any of aspects 14 through 18, wherein transmitting the control signaling comprises: transmitting the control signaling indicating a time period, wherein the power headroom report is received upon expiration of the time period.

Aspect 20: The method of any of aspects 14 through 19, wherein transmitting the control signaling comprises: transmitting the control signaling indicating a time period, wherein receiving the power headroom report is based at least in part on upon expiration of the time period and the calculated available power headroom satisfying an expected available power headroom threshold, the calculated available power headroom satisfying a specific absorption rate threshold, or both.

Aspect 21: The method of any of aspects 14 through 20, wherein the time interval is a symbol period, a transmission occasion, a slot, or a combination thereof.

Aspect 22: The method of any of aspects 14 through 21, wherein the power headroom report indicates a power headroom at a symbol index, a transmission occasion index, a slot index, or a combination thereof, corresponding to the time interval.

Aspect 23: The method of any of aspects 14 through 22, wherein scheduling the one or more uplink messages further comprises: scheduling a plurality of uplink messages at the UE based at least in part on the calculated available power headroom satisfying a threshold.

Aspect 24: The method of any of aspects 14 through 23, wherein scheduling the one or more uplink messages further comprises: scheduling a single uplink message at the UE based at least in part on the calculated available power headroom satisfying a threshold.

Aspect 25: The method of any of aspects 14 through 24, wherein the power headroom report comprises a current power headroom at the UE and the calculated available power headroom.

Aspect 26: The method of any of aspects 14 through 25, wherein transmitting the control signaling comprises: transmitting the control signaling comprising one or more information elements indicating a duration of the time interval, a power headroom reporting time period, a power headroom prohibition time period, or any combination thereof.

Aspect 27: An apparatus for wireless communication at a UE, comprising a processor; memory coupled with the processor; and instructions stored in the memory and executable by the processor to cause the apparatus to perform a method of any of aspects 1 through 13.

Aspect 28: An apparatus for wireless communication at a UE, comprising at least one means for performing a method of any of aspects 1 through 13.

Aspect 29: A non-transitory computer-readable medium storing code for wireless communication at a UE, the code comprising instructions executable by a processor to perform a method of any of aspects 1 through 13.

Aspect 30: An apparatus for wireless communication at a base station, comprising a processor; memory coupled with the processor; and instructions stored in the memory and executable by the processor to cause the apparatus to perform a method of any of aspects 14 through 26.

Aspect 31: An apparatus for wireless communication at a base station, comprising at least one means for performing a method of any of aspects 14 through 26.

Aspect 32: A non-transitory computer-readable medium storing code for wireless communication at a base station, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling indicating a time interval over which to determine available power headroom relative to a transmission power threshold;
   calculating, based at least in part on the control signaling, the available power headroom as a difference between the transmission power threshold and a statistical transmission power value calculated across a plurality of uplink carriers during within the time interval; and
   transmitting a power headroom report indicating the calculated available power headroom based at least in part on a condition for transmitting the power headroom report being satisfied, the condition being that the calculated available power headroom satisfies an expected available power headroom threshold indicating additional transmit power is available at the UE.

2. The method of claim 1, wherein receiving the control signaling comprises:
   receiving, via a control channel, a control message scheduling transmission of an uplink channel carrying the power headroom report, wherein the time interval over which the calculated available power headroom is calculated comprises a transmission duration of the control channel.

3. The method of claim 2, wherein an end in time of the time interval over which the calculated available power headroom is calculated corresponds to an end in time of the control channel.

4. The method of claim 1, wherein receiving the control signaling comprises:
   receiving radio resource control signaling configuring a resource allocation for transmission of an uplink channel carrying the power headroom report, wherein the time interval over which the calculated available power headroom is calculated is offset from the resource allocation by a defined amount of time.

5. The method of claim 4, wherein an end in time of the time interval over which the calculated available power headroom is calculated corresponds to the defined amount of time.

6. The method of claim 1, wherein receiving the control signaling comprises:
   receiving the control signaling indicating a time period, wherein the power headroom report is transmitted after expiration of the time period.

7. The method of claim 1, wherein receiving the control signaling comprises:
receiving the control signaling indicating a time period, wherein transmitting the power headroom report is based at least in part on after expiration of the time period, the calculated available power headroom satisfying a specific absorption rate threshold, or both.

8. The method of claim 1, wherein the statistical transmission power value comprises an average transmission power calculated for the plurality of uplink carriers within the time interval.

9. The method of claim 1, wherein the time interval is a symbol period, a transmission occasion, a slot, or a combination thereof.

10. The method of claim 1, wherein the power headroom report indicates a power headroom at a symbol index, a transmission occasion index, a slot index, or a combination thereof, corresponding to the time interval.

11. The method of claim 1, wherein receiving the control signaling comprises:
receiving the control signaling indicating to calculate the available power headroom for at least one frequency range of a plurality of frequency ranges associated with one or more uplink transmissions by the UE, for at least one frequency band of a plurality of frequency bands associated with the one or more uplink transmissions, for at least one cell group of a plurality of cell groups associated with a network device, or a combination thereof.

12. The method of claim 1, wherein the power headroom report indicates a current power headroom and the calculated available power headroom.

13. The method of claim 1, wherein receiving the control signaling comprises:
receiving the control signaling comprising one or more information elements indicating a duration of the time interval, a power headroom reporting time period, a power headroom prohibition time period, or any combination thereof.

14. A method for wireless communication at a network device, comprising:
transmitting, to a user equipment (UE), control signaling indicating a time interval over which to determine a calculated available power headroom, the calculated available power headroom being a difference between a transmission power threshold and a statistical transmission power value calculated across a plurality of uplink carriers within the time interval;
receiving, from the UE, a power headroom report indicating the calculated available power headroom based at least in part on a condition for communicating the power headroom report being satisfied, the condition being that the calculated available power headroom satisfies an expected available power headroom threshold indicating additional transmit power is available at the UE; and
scheduling one or more uplink messages at the UE according to the calculated available power headroom.

15. The method of claim 14 further comprising:
transmitting, via a control channel, a control message scheduling transmission of an uplink channel carrying the power headroom report, wherein the time interval over which the calculated available power headroom is calculated comprises a transmission duration of the control channel.

16. The method of claim 15, wherein an end in time of the time interval over which the calculated available power headroom is calculated corresponds to an end in time of the control channel.

17. The method of claim 14 further comprising:
transmitting radio resource control signaling configuring a resource allocation for transmission of an uplink channel carrying the power headroom report, wherein the time interval over which the calculated available power headroom is calculated is offset from the resource allocation by a defined amount of time.

18. The method of claim 17, wherein an end in time of the time interval over which the calculated available power headroom is calculated corresponds to the defined amount of time.

19. The method of claim 14, wherein transmitting the control signaling comprises:
transmitting the control signaling indicating a time period, wherein the power headroom report is received after expiration of the time period.

20. The method of claim 14, wherein transmitting the control signaling comprises:
transmitting the control signaling indicating a time period, wherein receiving the power headroom report is based at least in part on after expiration of the time period, the calculated available power headroom satisfying a specific absorption rate threshold, or both.

21. The method of claim 14, wherein the time interval is a symbol period, a transmission occasion, a slot, or a combination thereof.

22. The method of claim 14, wherein the power headroom report indicates a power headroom at a symbol index, a transmission occasion index, a slot index, or a combination thereof, corresponding to the time interval.

23. The method of claim 14, wherein scheduling the one or more uplink messages further comprises:
scheduling a plurality of uplink messages at the UE based at least in part on the calculated available power headroom satisfying a threshold.

24. The method of claim 14, wherein scheduling the one or more uplink messages further comprises:
scheduling a single uplink message at the UE based at least in part on the calculated available power headroom satisfying a threshold.

25. The method of claim 14, wherein the power headroom report comprises a current power headroom at the UE and the calculated available power headroom.

26. The method of claim 14, wherein transmitting the control signaling comprises:
transmitting the control signaling comprising one or more information elements indicating a duration of the time interval, a power headroom reporting time period, a power headroom prohibition time period, or any combination thereof.

27. An apparatus for wireless communication at a user equipment (UE), comprising:
one or more processors; and
one or more memories coupled with the one or more processors and storing instructions executable by the one or more processors to cause the apparatus to:
receive control signaling indicating a time interval over which to determine available power headroom relative to a transmission power threshold;
calculate, based at least in part on the control signaling, the available power headroom as a difference between the transmission power threshold and a statistical transmission power value calculated across a plurality of uplink carriers within the time interval; and transmit a power headroom report indicating the calculated available power headroom based at least in part on a condition for transmitting the power headroom report being satisfied, the condition being that the calculated available power headroom satisfies an expected available power headroom threshold indicating additional transmit power is available at the UE.

28. The apparatus of claim 27, wherein the instructions to receive the control signaling are executable by the one or more processors to cause the apparatus to:

receive, via a control channel, a control message scheduling transmission of an uplink channel carrying the power headroom report, wherein the time interval over which the calculated available power headroom is calculated comprises a transmission duration of the control channel.

29. The apparatus of claim 27, wherein the instructions to receive the control signaling are executable by the one or more processors to cause the apparatus to:

receive radio resource control signaling configuring a resource allocation for transmission of an uplink channel carrying the power headroom report, wherein the time interval over which the calculated available power headroom is calculated is offset from the resource allocation by a defined amount of time.

30. An apparatus for wireless communication at a network device, comprising:

one or more processors; and one or more memories coupled with the one or more processors and storing instructions executable by the one or more processors to cause the apparatus to:

transmit, to a user equipment (UE), control signaling indicating a time interval over which to determine a calculated available power headroom, the calculated available power headroom being a difference between a transmission power threshold and a statistical transmission power value calculated across a plurality of uplink carriers within the time interval;

receive, from the UE, a power headroom report indicating the calculated available power headroom based at least in part on a condition for communicating the power headroom report being satisfied, the condition being that the calculated available power headroom satisfies an expected available power headroom threshold indicating additional transmit power is available at the UE; and schedule one or more uplink messages at the UE according to the calculated available power headroom.

* * * * *